(12) United States Patent
Melville et al.

(10) Patent No.: US 12,174,318 B2
(45) Date of Patent: Dec. 24, 2024

(54) METHOD AND SYSTEM FOR DETECTING FIBER POSITION IN A FIBER SCANNING PROJECTOR

(71) Applicant: Magic Leap, Inc., Plantation, FL (US)

(72) Inventors: Charles David Melville, Camano Island, WA (US); Mathew D. Watson, Bellevue, WA (US); Abhijith Rajiv, Seattle, WA (US); Benjamin John Kuehn, Seattle, WA (US)

(73) Assignee: Magic Leap, Inc., Plantation, FL (US)

( * ) Notice: Subject to any disclaimer, the term of this patent is extended or adjusted under 35 U.S.C. 154(b) by 976 days.

(21) Appl. No.: 17/104,650

(22) Filed: Nov. 25, 2020

(65) Prior Publication Data

US 2021/0156967 A1 May 27, 2021

Related U.S. Application Data

(60) Provisional application No. 63/022,019, filed on May 8, 2020, provisional application No. 62/941,206, filed on Nov. 27, 2019.

(51) Int. Cl.
*G01S 7/481* (2006.01)
*G02B 26/10* (2006.01)

(52) U.S. Cl.
CPC .......... *G01S 7/4813* (2013.01); *G01S 7/4817* (2013.01); *G02B 26/103* (2013.01)

(58) Field of Classification Search
None
See application file for complete search history.

(56) References Cited

U.S. PATENT DOCUMENTS

| 5,727,098 A * | 3/1998 | Jacobson ............. G02B 26/103 385/38 |
| 2008/0265178 A1 | 10/2008 | Johnston |
| 2009/0235396 A1* | 9/2009 | Wang .................. A61B 1/0655 850/6 |
| 2011/0061452 A1 | 3/2011 | King et al. |
| 2011/0317967 A1 | 12/2011 | Kumkar et al. |

(Continued)

FOREIGN PATENT DOCUMENTS

| CN | 108844718 A | 11/2018 | |
| CN | 112444965 A * | 3/2021 | ............... G01V 8/18 |
| WO | 2017096697 A1 | 6/2017 | |

OTHER PUBLICATIONS

Grober, et al. (1994), Design and implementation of a low temperature near-field scanning optical microscope, Review of Scientific Instruments vol. 65 issue 3, pp. 626-631 (Year: 1994).*

(Continued)

*Primary Examiner* — Eric L Bolda
(74) *Attorney, Agent, or Firm* — KILPATRICK TOWNSEND & STOCKTON LLP

(57) ABSTRACT

A projector includes a cantilever position detection system. The projector also includes a chassis, an actuator mounted to the chassis, and a cantilever light source having a longitudinal axis and mechanically coupled to the actuator. The projector also includes a position measurement region including an aperture, wherein the cantilever light source extends through the aperture, and a plurality of optical source/photodetector pairs disposed in a lateral plane orthogonal to the longitudinal axis.

19 Claims, 21 Drawing Sheets

(56) References Cited

U.S. PATENT DOCUMENTS

| | | |
|---|---|---|
| 2014/0231647 A1* | 8/2014 | Chinn .................. G01S 7/4818 250/353 |
| 2015/0016777 A1 | 1/2015 | Abovitz et al. |
| 2015/0235441 A1 | 8/2015 | Abovitz et al. |
| 2016/0285227 A1 | 9/2016 | Farrow et al. |
| 2017/0199384 A1 | 7/2017 | Yeoh et al. |
| 2018/0275396 A1 | 9/2018 | Schowengerdt et al. |
| 2018/0278924 A1 | 9/2018 | Schowengerdt et al. |
| 2018/0288404 A1 | 10/2018 | Ikehara et al. |

OTHER PUBLICATIONS

U.S. Appl. No. 17/090,600 , "Non-Final Office Action", Feb. 14, 2023, 17 pages.
U.S. Appl. No. 17/090,600, "Final Office Action", Aug. 9, 2023, 15 pages.
U.S. Appl. No. 17/090,600, "Non-Final Office Action", Dec. 21, 2023, 17 pages.
U.S. Appl. No. 17/090,600, "Final Office Action", May 17, 2024, 20 pages.
U.S. Appl. No. 17/090,600, "Non-Final Office Action", Oct. 25, 2024, 21 pages.

* cited by examiner

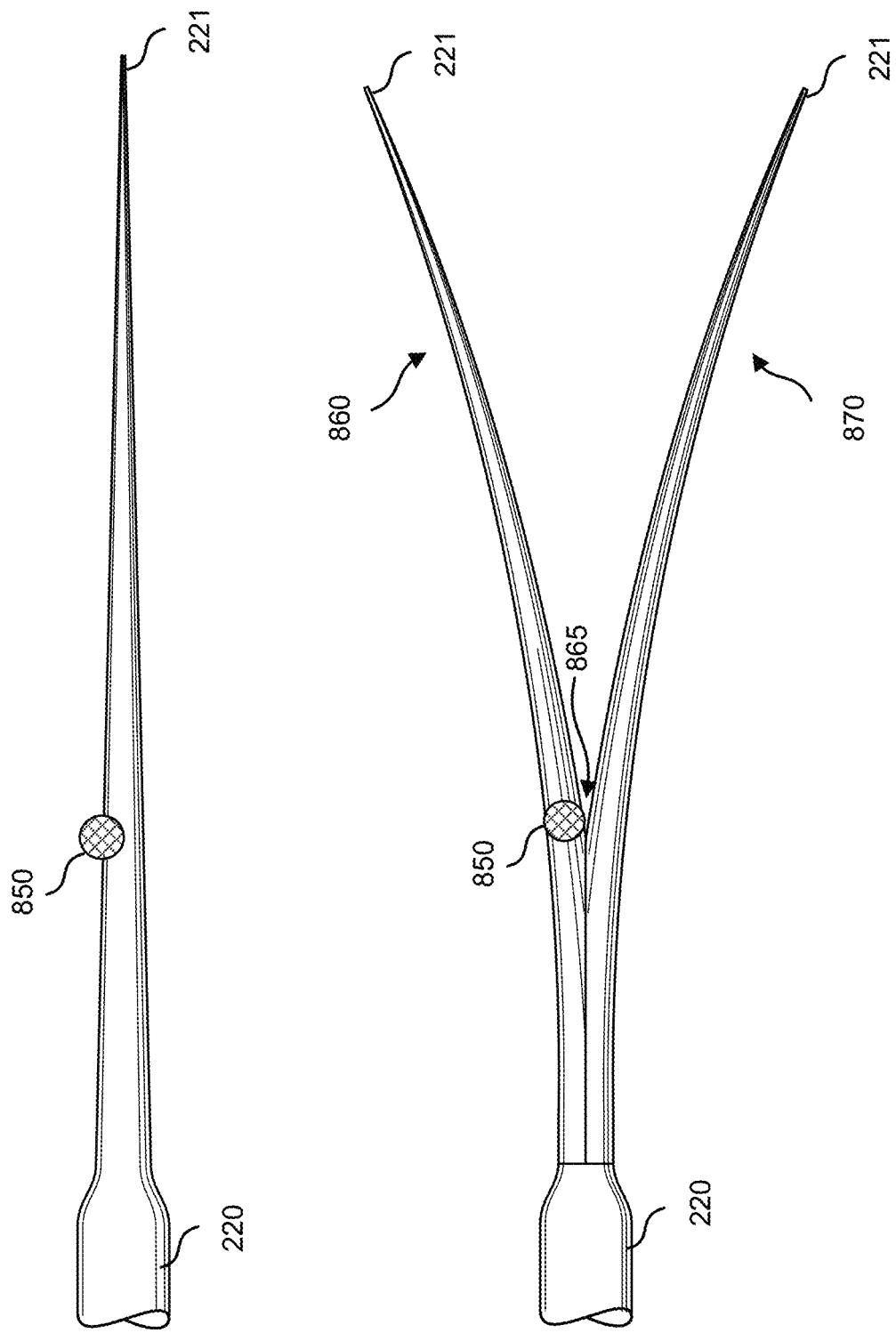

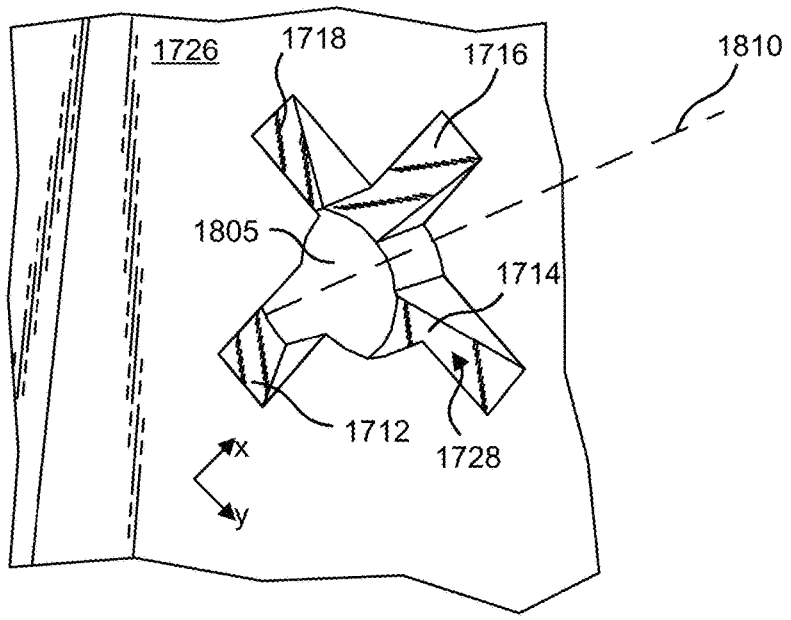
FIG. 18A
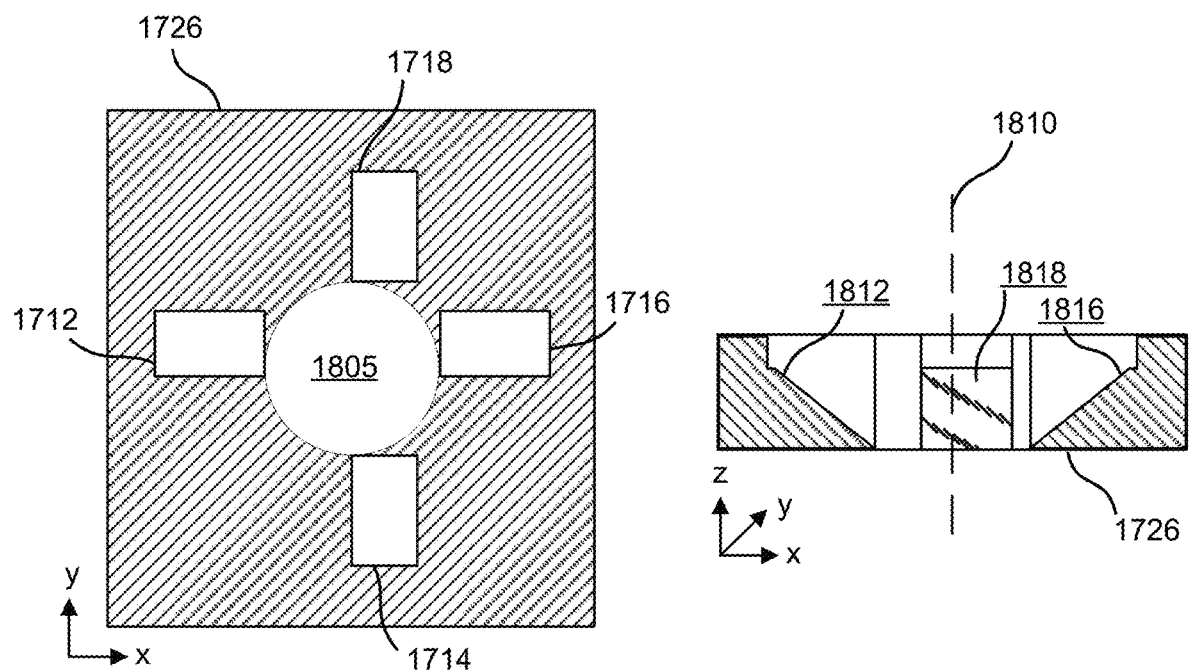
FIG. 18B
FIG. 18C

METHOD AND SYSTEM FOR DETECTING FIBER POSITION IN A FIBER SCANNING PROJECTOR

CROSS-REFERENCES TO RELATED APPLICATIONS

This application claims priority to U.S. Provisional Patent Application No. 62/941,206, filed on Nov. 27, 2019, entitled "METHOD AND SYSTEM FOR DETECTING FIBER POSITION IN A FIBER SCANNING PROJECTOR," and U.S. Provisional Patent Application No. 63/022,019, filed on May 8, 2020, entitled "METHOD AND SYSTEM FOR DETECTING FIBER POSITION IN A FIBER SCANNING PROJECTOR," the disclosures of which are hereby incorporated by reference in their entirety for all purposes.

BACKGROUND OF THE INVENTION

Modern computing and display technologies have facilitated the development of systems for so-called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems related to projection display systems including wearable displays. More particularly, embodiments of the present invention provide methods and systems for determining the position of a scanning cantilever as a function of time. In a particular embodiment, the scanning cantilever can be a scanning fiber and a plurality of light emitting diodes can be utilized to detect the position of the scanning fiber, and the location at which display light is projected by the fiber. The invention is applicable to a variety of applications in computer vision and image display systems.

As described more fully herein, embodiments of the present invention enable the detection of the location of a scanning optical waveguide in space and time. In an embodiment, the displacement of the resonant cantilever, which can be a fiber, is utilized to vary the amount of light emitted from light sources reaching photodetectors. Although the description herein generally relates to the use of fiber scanners as the resonant cantilever, embodiments of the present invention are not limited to fiber scanners and other resonant cantilevers, including MEMS-based resonators are included within the scope of the present invention.

According to an embodiment of the present invention, a projector including a cantilever position detection system is provided. The projector includes a chassis, an actuator mounted to the chassis, and a cantilever light source having a longitudinal axis and mechanically coupled to the actuator. The projector also includes a position measurement region including an aperture. The cantilever light source extends through the aperture. The projector also includes a plurality of optical source/photodetector pairs disposed in a lateral plane orthogonal to the longitudinal axis.

According to another embodiment of the present invention, a method of measuring a position of a scanning cantilever is provided. The method includes providing a housing including an actuation region, a position measurement region including an aperture, and an oscillation region. The scanning cantilever extends from the actuation region through the aperture in the position measurement region to the oscillation region. The method also includes providing a drive signal to an actuator disposed in the actuation region, oscillating the scanning cantilever in response to the drive signal, generating a first light beam using a first optical source disposed in the position measurement region, directing the first light beam toward the aperture in the position measurement region, and detecting at least a portion of the first light beam using a first photodetector. The method further includes generating a second light beam using a second optical source disposed in the position measurement region, directing the second light beam toward the aperture in the position measurement region, detecting at least a portion of the second light beam using a second photodetector, and determining the position of the scanning cantilever based on the detected portion of the first light beam and the detected portion of the second light beam.

According to a particular embodiment of the present invention, a projector including a cantilever position detection system is provided. The projector includes a chassis, an actuator mounted to the chassis, and a cantilever light source having a longitudinal axis and mechanically coupled to the actuator. The projector also includes a mirror having an aperture. The cantilever light source extends through the aperture. The projector further includes a plurality of optical source/photodetector pairs coupled to the mirror.

According to an embodiment of the present invention, a method of measuring a position of a scanning cantilever is provided. The method includes providing a housing including an actuation region, a position measurement region including an aperture, and an oscillation region. The scanning cantilever extends from the actuation region through the aperture in the position measurement region to the oscillation region. The method also includes providing a drive signal to an actuator disposed in the actuation region, oscillating the scanning cantilever in response to the drive signal, and generating a first light beam using a first optical source disposed in the position measurement region. The method further includes directing the first light beam toward the aperture in the position measurement region, detecting at least a portion of the first light beam using a first photodetector, generating a second light beam using a second optical source disposed in the position measurement region, directing the second light beam toward the aperture in the position measurement region, detecting at least a portion of the second light beam using a second photodetector, and determining the position of the scanning cantilever based on the detected portion of the first light beam and the detected portion of the second light beam.

In a particular embodiment, directing the first light beam toward the aperture comprises propagating the first light beam in a first channel and directing the second light beam toward the aperture comprises propagating the second light beam in a second channel. A printed circuit board can be disposed in the position measurement region and the first optical source, the first photodetector, the second optical source, and the second photodetector can be mounted on the printed circuit board. The first optical source, the first detector, the second optical source, and the second photodetector can be light emitting diodes. The first optical source and the second optical source can be light emitting diodes and the first photodetector and the second photodetector can be photodiodes. The scanning cantilever can include a scanning fiber that includes a reflective or absorbing coating.

In an embodiment, the scanning fiber is characterized by a longitudinal axis and the first optical source, the first photodetector, the second optical source, and the second photodetector are disposed in a lateral plane orthogonal to the longitudinal axis.

According to a specific embodiment of the present invention, a projector including a cantilever position detection system is provided. The projector includes a chassis, an actuator mounted to the chassis, a cantilever light source having a longitudinal axis and mechanically coupled to the actuator, and a mirror having an aperture. The cantilever light source extends through the aperture. The projector also includes a plurality of optical source/photodetector pairs coupled to the mirror.

The cantilever light source can be a scanning light source that can include a scanning waveguide source. The actuator can be a piezoelectric actuator and the cantilever light source can be a scanning fiber mechanically coupled to the piezoelectric actuator and defining a convex object surface. A diameter of the scanning fiber can be D and a beam width associated with each of the plurality of optical sources can be 2D. In an embodiment, the scanning waveguide source comprises a microelectromechanical system (MEMS) element including a cantilevered waveguide. The plurality of optical source/photodetector pairs can include a first optical source and a first detector joined by a first optical path and a second optical source and a second photodetector joined by a second optical path. The first optical path is orthogonal to the second optical path in an embodiment. The first optical source, the first detector, the second optical source and the second detector can be light emitting diodes. The first optical source and the second optical source can be light emitting diodes and the first photodetector and the second photodetector can be photodiodes. The plurality of optical source/photodetector pairs can be mounted to a surface of the mirror adjacent the chassis. The projector can also include a spectral filter disposed between at least one of the optical source/photodetector pairs. The projector can additionally include an integrated lens assembly including a plurality of lenses, each of the plurality of lenses being optically coupled to one of the plurality of optical sources or plurality of photodetectors. The cantilever light source can be characterized by an intersection defined by surfaces of the cantilever light source at opposing maximum deflections. The plurality of optical source/photodetector pairs can be disposed proximal to the intersection. In an embodiment, the diameter of the cantilever light source is D, the beam width associated with each of the plurality of optical sources is 2D, and the position measurement region is disposed within 5D of the intersection. In an embodiment, the plurality of optical sources can be semiconductor lasers and the plurality of photodetectors can be photodiodes. The projector can further include an optically opaque element positioned adjacent each photodetector of the plurality of photodetectors.

According to another particular embodiment of the present invention, a projector including a cantilever position detection system is provided. The projector includes a chassis, an actuator mounted to the chassis, and a cantilever light source having a longitudinal axis and mechanically coupled to the actuator. The projector also includes a position measurement region including an aperture. The cantilever light source extends through the aperture. The projector further includes a plurality of optical fiber pairs, with each optical fiber pair comprising an optical source fiber and an optical receiver fiber, a collar receiving the plurality of optical fiber pairs, and one or more pairs of reflective optics. Each pair of reflective optics is positioned to convey light from an optical source fiber to an optical receiver fiber of an optical fiber pair of the plurality of optical fiber pairs. The one or more pairs of reflective optics can include a substrate having one or more pairs of reflectors disposed on a surface of the substrate. The substrate can include a metal plate and the one or more pairs of reflectors can be facets of a surface of the substrate. As an example, the metal plate can be made of brass. The collar can have a collar aperture and the collar can be disposed in the position measurement region such that the collar aperture is coaxial with the longitudinal axis.

A diameter of the cantilever light source can be D, and the cantilever light source can have a rest position within the collar aperture aligned with the longitudinal axis and a maximum extension L that is radially symmetric and azimuthally symmetric about the longitudinal axis. A first pair of reflective optics can be disposed in the substrate at an offset of D/2 from the longitudinal axis along a first direction orthogonal to the longitudinal axis and a second pair of reflective optics can be disposed in the substrate at an offset of D/2 from the longitudinal axis along a second direction orthogonal to the first direction. In an embodiment, a beam width associated with each of the plurality of optical fiber pairs can be D. The projector can also include at least one light source optically coupled to at least one optical source fiber and a plurality of photodetectors each optically coupled to a single optical receiver fiber of an optical fiber pair of the plurality of optical fiber pairs. The at least one light source can be disposed on the chassis and the plurality of photodetectors can be disposed on the chassis.

Numerous benefits are achieved by way of the present invention over conventional techniques. For example, embodiments of the present invention provide methods and systems that provide real time or near real time detection of the position of an optical waveguide integrated with a resonant cantilever in two dimensions in order to provide feedback to the control system that provides the drive signal for the resonant cantilever, as well as the system producing the optical signal present in the waveguide. More importantly, embodiments of the present invention provide highly compact and low cost systems for cantilever position detection that are compatible with compact fiber scanner systems, enabling a form factor comparable to standard eyeglasses. These and other embodiments of the invention along with many of its advantages and features are described in more detail in conjunction with the text below and attached figures.

BRIEF DESCRIPTION OF THE DRAWINGS

FIG. 8B is a simplified cross-sectional diagram illustrating a scanning fiber in a rest position according to an embodiment of the present invention.

FIG. 8C is a simplified cross-sectional diagram illustrating a scanning fiber in maximum deflection positions according to an embodiment of the present invention.

FIG. 18A is a simplified enlarged perspective view illustrating an implementation of a fiber position detection system with a collar including reflectors according to an embodiment of the present invention.

FIG. 18B is a simplified enlarged plan view illustrating an implementation of a fiber position detection system with a collar including reflectors according to an embodiment of the present invention.

FIG. 18C is a simplified enlarged cross-sectional view illustrating an implementation of a fiber position detection system with a collar including reflectors according to an embodiment of the present invention.

DETAILED DESCRIPTION OF SPECIFIC EMBODIMENTS

The present invention relates generally to methods and systems related to projection display systems including wearable displays. More particularly, embodiments of the present invention provide methods and systems for volumetric displays, also referred to as light field displays, that create volumetric sculptures of light at more than one depth plane. The invention is applicable to a variety of applications in computer vision and image display systems.

Resonant cantilever structures that include optical waveguides are being used to transport and project light, which can be referred to as an optical signal, to produce virtual content for optical displays. These resonant cantilevers can move in many types of scan patterns, including raster, spiral, elliptical, propeller, or the like. In order to operate these scan patterns efficiently, precise knowledge of the waveguide's position at any particular time to a high degree of accuracy is useful in producing an undistorted image. This information related to the temporal position of the resonant cantilever can be used to provide "feedback" to the control system that provides the drive signal for the resonant cantilever, as well as the system producing the optical signal in the waveguide.

Figure 1:
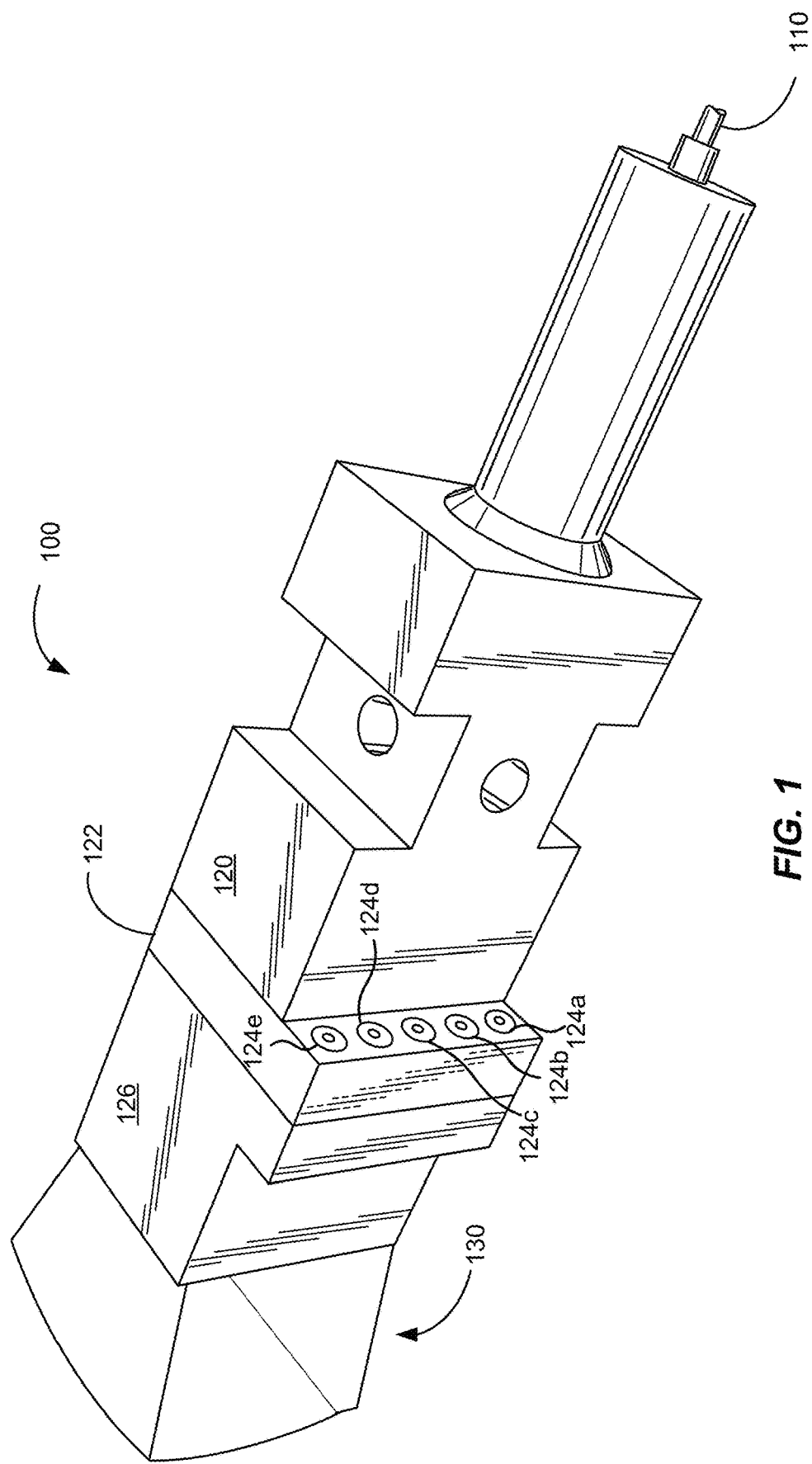
FIG. 1 is a simplified perspective view illustrating a fiber scanning projector according to an embodiment of the present invention.

FIG. 1 is a simplified perspective view illustrating a fiber scanning projector according to an embodiment of the present invention. The fiber scanning projector 100, which can have dimensions on the order of 2 mm×2 mm×7 mm, includes an optical fiber 110 that carries an optical signal that can be used to project an image, also referred to as a virtual image. Driven by piezoelectric actuators (not illustrated in FIG. 1 and described more fully below), optical fiber 110 oscillates, for example, in a spiral configuration with an increasing angular deflection during the projection of light for a given frame time. Input light to fiber scanning projector 100 is provided through optical fiber 110 and output light from fiber scanning projector 100 is provided through one or more of the surfaces of optical assembly section 130. The various elements of the fiber scanning projector are described more fully throughout the present specification.

As illustrated in FIG. 1, fiber scanning projector 100 includes a chassis 120 that is joined to a printed circuit board (PCB) 122. PCB 122 includes a plurality of electrical connectors 124a through 124e, which can be utilized as LED/photodetector connectors to provide electrical signals to LEDs or other optical sources disposed in the fiber scanning projector and to provide electrical signals to, and to receive signals from, photodetectors disposed in the fiber scanning projector. A PCB cover 126 is utilized to cap the PCB as well as provide mechanical support for optical assembly section 130. Chassis 120, PCB 122, and PCB cover 126 can be considered as a single unit, which can be referred to as a housing.

Figure 2:
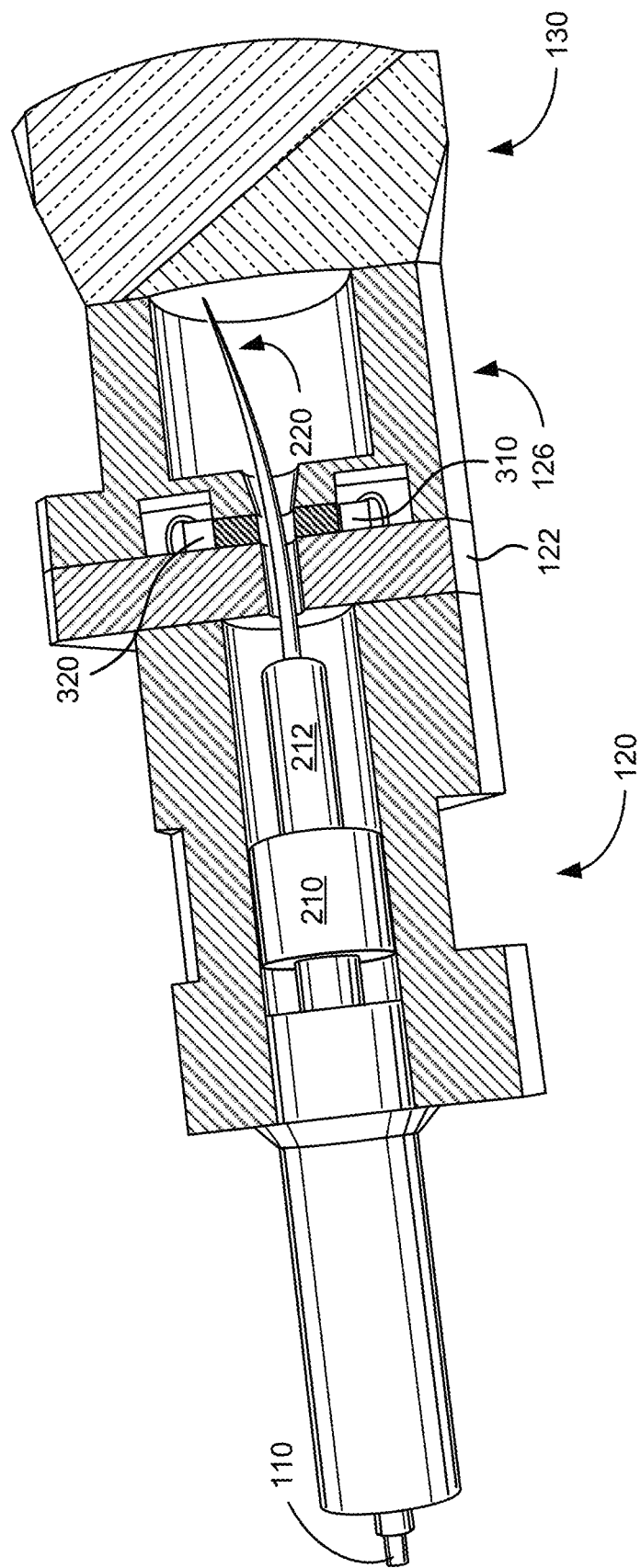
FIG. 2 is a simplified cutaway perspective view illustrating a fiber scanning projector according to an embodiment of the present invention.

FIG. 2 is a simplified cutaway perspective view illustrating a fiber scanning projector according to an embodiment of the present invention. Referring to FIG. 2, elements illustrated in FIG. 1 are also illustrated in FIG. 2 and the description provided in relation to these elements in FIG. 1 is applicable to FIG. 2 as applicable. In the view illustrated in FIG. 2, fiber scanning projector 100 has been rotated horizontally. Optical fiber 110 is illustrated on the left hand side of the figure, providing an input to the fiber scanning projector. Chassis 120 provides mechanical support for retention collar 210, which, in turn, provides mechanical support for piezoelectric actuator 212, which is driven by electric signals from wires that are not shown. Scanning fiber 220 passes through piezoelectric actuator 212 and is illustrated in a deflected position. After exiting piezoelectric actuator 212, scanning fiber 220 passes through PCB 122 into an interior region of PCB cover 126. Optical assembly section 130 is mounted to PCB cover 126.

As will be evident to one of skill in the art, scanning fiber 220 is operable to oscillate with an increasing angular deflection during a given frame time in order to project light toward optical assembly section 130. Optical assembly section 130 receives light from scanning fiber 220 as described more fully in U.S. Patent Application Publication No. 2018/0275396, filed on Mar. 21, 2018 and entitled "Method and System for Fiber Scanning Projector," the disclosure of which is hereby incorporated by reference in its entirety for all purposes.

As an example, during operation, scanning fiber 220, which is mechanically attached to piezoelectric actuator 212, oscillates in the interior region of PCB cover 126. In an embodiment, piezoelectric actuator 212 includes four electrodes (not shown) that are distributed at circumferential positions that are shifted 90° with respect to each other. Accordingly, positive and negative voltages applied to opposing sides of the piezoelectric actuator can flex the actuator, and the scanning fiber as a result, in the plane of the electrodes. By driving all four electrodes in synchronization, oscillation of the scanning fiber can be accomplished. As the light exits scanning fiber 220, it is coupled into optical assembly section 130.

In order to measure the position of the scanning fiber as a function of time, two sets of optical source/photodetector pairs are mounted laterally with respect to the scanning fiber such that, as the scanning fiber oscillates, the scanning fiber may partially or completely occlude light emitted from the optical source and detected at a matching photodetector. An exemplary optical source/photodetector pair is illustrated by optical source 310 and photodetector 320 in FIG. 2, and described more fully below in relation to FIGS. 3-5.

Figure 3:
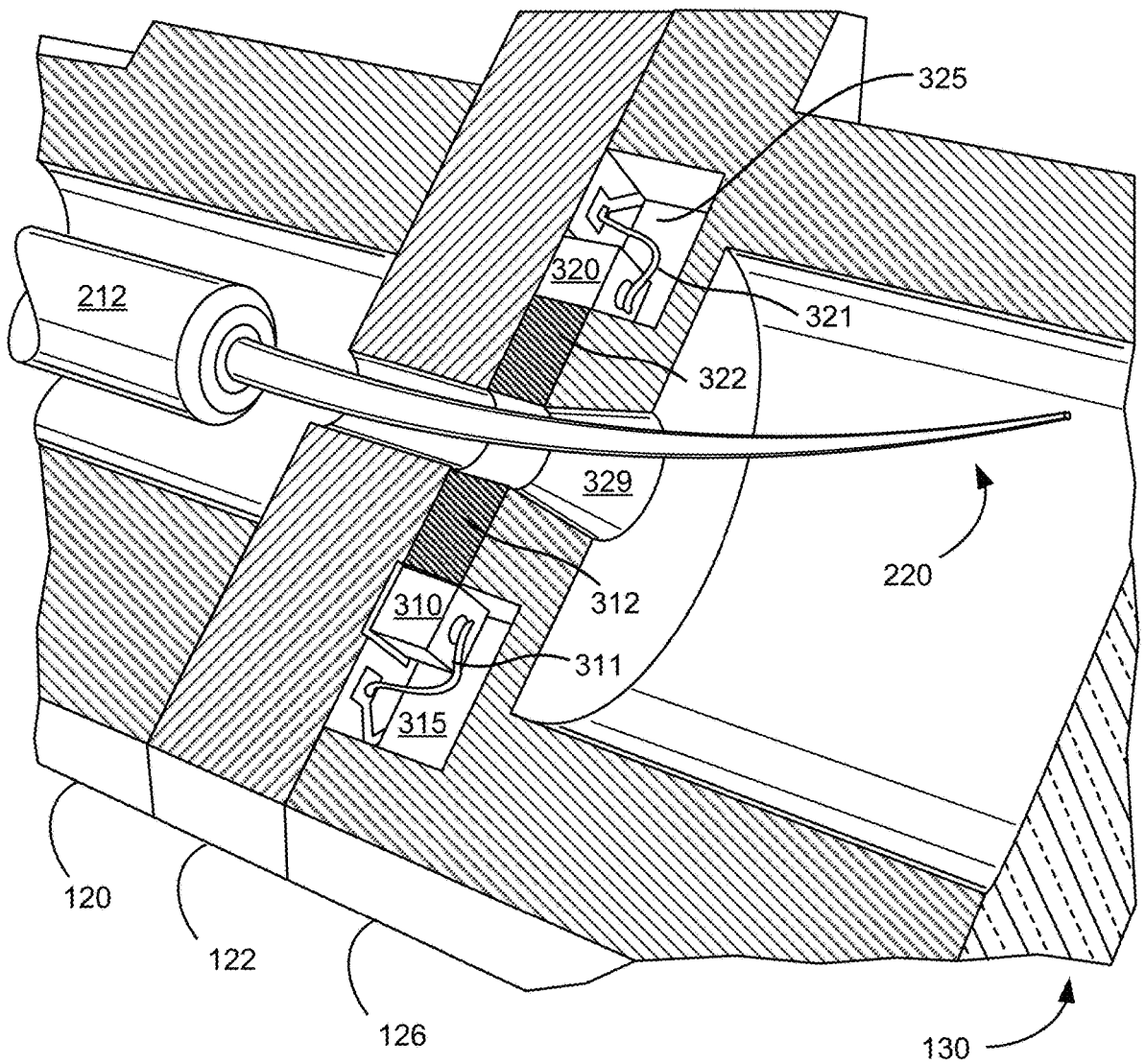
FIG. 3 is a simplified cutaway perspective view illustrating elements of a fiber position detection system integrated into a fiber scanning projector according to an embodiment of the present invention.

FIG. 3 is a simplified cutaway perspective view illustrating elements of a fiber position detection system integrated into a fiber scanning projector according to an embodiment of the present invention. Referring to FIG. 3, elements illustrated in FIGS. 1 and 2 are also illustrated in FIG. 3 and the description provided in relation to these elements in FIGS. 1 and 2 is applicable to FIG. 3 as applicable.

Scanning fiber 220 is illustrated passing through piezoelectric actuator 212, PCB 122, and a portion of PCB cover 126. Scanning fiber 220 is illustrated in a deflected position in the interior region of PCB cover 126. In order to detect or measure the position of scanning fiber 220, an optical source 310, which can be a light emitting diode (LED), is utilized in conjunction with a photodetector 320 as described more fully herein. In addition to conventional LEDs, micro-LEDs, organic LEDs (OLEDs), micro-displays including a two dimensional array of optical emitters, surface emitting lasers, edge emitting lasers, super luminescent diodes, or the like can be utilized in various embodiments of the present invention.

In addition to the use of photodetector 320, LEDs or other diode elements typically used as light emitters can be utilized to detect light emitted by optical source 310. As an example, in place of photodetector 320, an LED could be utilized as a detector. As will be evident to one of skill in the art, when exposed to light, a photodiode produces a current that is proportional to the intensity of the light. This current flows in the opposite direction to current in a normal diode or LED. Thus, in addition to emitting light, an LED can be used as a photodetector in some embodiments. Thus, purpose built photodiodes as well as LEDs can be utilized, both of which are available in different material systems, with embodiments of the present invention.

Referring to FIG. 3, recess 315 is formed in PCB cover 126 to enable mounting of optical source 310, which can be an LED, on PCB 122. Current for optical source 310 is provided using wire bond 311, which is connected to drive circuitry (not shown). Light emitted by optical source 310 passes through infrared filter 312, which passes infrared light and blocks visible light in order to prevent stray light from leaking into optical assembly section 130. In a manner similar to recess 315 used to create a space for mounting of optical source 310, recess 325 is also formed in PCB cover 126 to enable mounting of photodetector 320, which can be a second LED, on PCB 122. Current for photodetector 320 is provided using wire bond 321, which is also connected to drive circuitry (not shown).

Light emitted by optical source 310, after passing through infrared filter 312, passes through scanning fiber 220 and/or orifice 329 in PCB cover 126, passes through infrared filter 322 and is detected at photodetector 320. Thus, optical source 310 and photodetector 320 work as a pair and are joined by an optical path extending between optical source 310 and photodetector 320. As described more fully herein, by measuring the amount of light detected at photodetector 320 as a function of time, in conjunction with similar measurements made using a second optical source/photodetector pair having a second optical path orthogonal to the optical path between optical source 310 and photodetector 320, the position of the scanning fiber 220 as a function of time can be determined with high accuracy.

Optical source 310 and photodetector 320 are disposed laterally with respect to scanning fiber 220. That is, with respect to the longitudinal axis of the scanning fiber, which is aligned with the fiber core, optical source 310 and photodetector 320 are disposed to the sides or laterally with respect to the longitudinal axis of the scanning fiber. This lateral positioning enables the optical path extending between optical source 310 and photodetector 320 to be orthogonal to the longitudinal axis of the scanning fiber when the scanning fiber is in a centered or resting position.

The operating wavelength of the optical source 310 and the photodetector 320 can be selected as appropriate to the particular application, cost measures, and the like. For example, infrared LEDs and detectors, in conjunction with optional spectral filters, can be utilized. In this example, the use of infrared wavelengths for position detection will not result in the generation of visible light, which could scatter into the display optics, impairing system performance. Similarly, visible light utilized in projection will not scatter into the position detection optical system, thereby enabling high signal-to-noise ratio performance. In other embodiments, other wavelengths, including ultraviolet wavelengths, can be utilized. One of ordinary skill in the art would recognize many variations, modifications, and alternatives.

Figure 4:
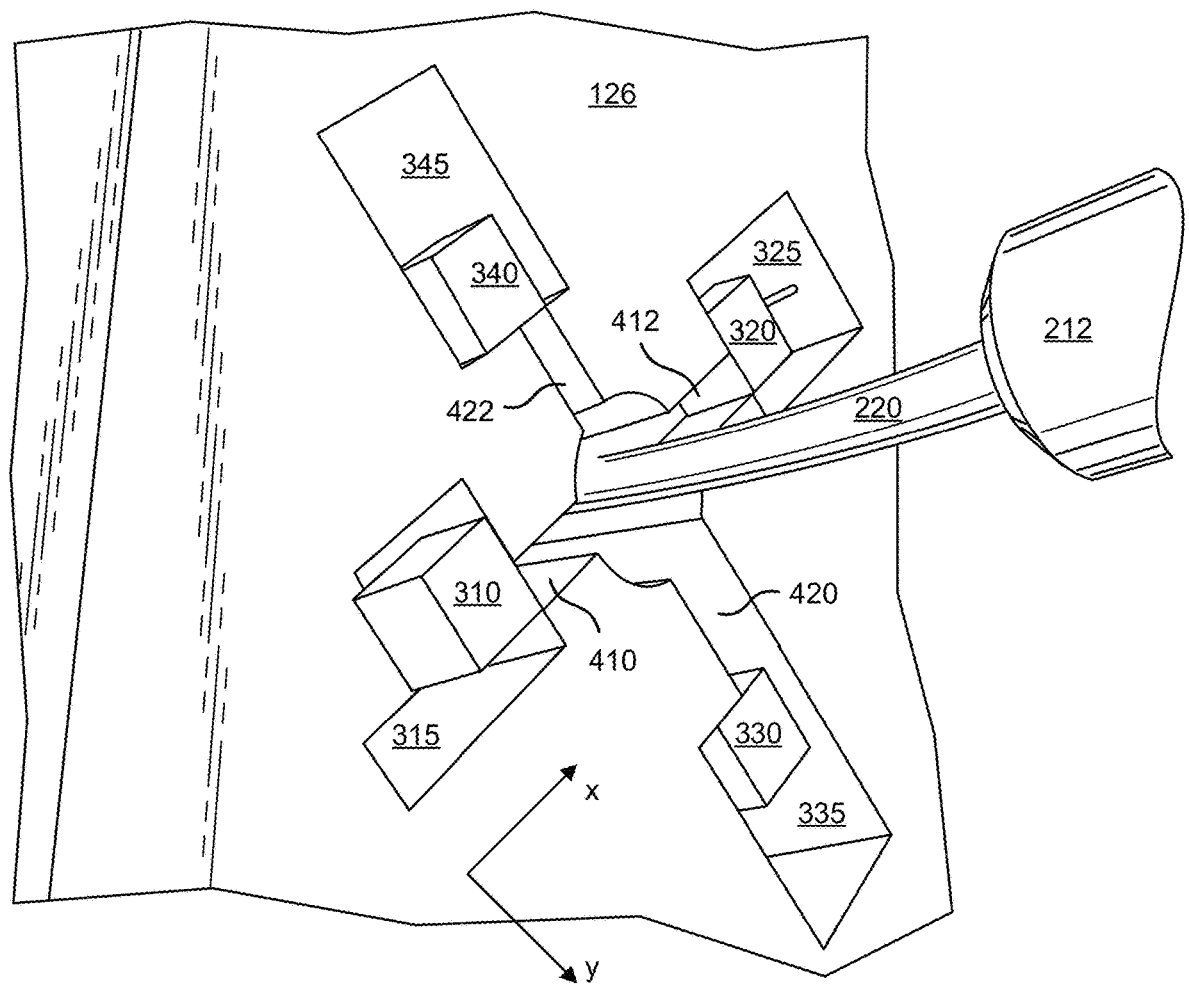
FIG. 4 is a simplified enlarged perspective view illustrating another implementation of a fiber position detection system with optical sources and detectors according to an embodiment of the present invention.

FIG. 4 is a simplified enlarged cutaway perspective view illustrating elements of the fiber position detection system integrated into a fiber scanning projector according to an embodiment of the present invention. In FIG. 4, optical sources and detectors as discussed above are illustrated. Referring to FIG. 4, a portion of PCB cover 126 is illustrated, with recesses 315 and 325 providing mounting space for optical source 310 and photodetector 320, respectively. In the perspective view illustrated in FIG. 4, which is from the perspective taken looking from the piezoelectric actuator 212 toward the tip of scanning fiber 220, the bottom portions of the optical sources and photodetector, which are bonded to PCB 122 in FIG. 3, are exposed and illustrated. Thus, in comparison with FIG. 3, PCB 122 has been removed in the view illustrated in FIG. 4 for purposes of clarity.

Optical source 310 and photodetector 320 are disposed at positions along the x-axis with an optical path joining optical source 310 and photodetector 320. Similarly, recesses 335 and 345 provide mounting space for a second optical source/photodetector pair, optical source 330 and photodetector 340. Optical source 330 and photodetector 340 are disposed at positions along the y-axis with a second optical path joining optical source 310 and photodetector 320. Thus, the two optical source/photodetector pairs have respective optical paths that are orthogonal to each other.

In order to receive light emitted by the optical sources, a first set of channels 410 and 412 is formed in a portion of PCB cover 126 to provide an unobstructed optical path (in the absence of scanning fiber 220 being present in the space between channels 410 and 412) between optical source 310 and photodetector 320. In a similar manner, a second set of channels 420 and 422 is formed in a portion of PCB cover 126 to provide an unobstructed optical path (in the absence of scanning fiber 220 being present in the space between channels 420 and 422) between optical source 330 and photodetector 340. In the embodiment illustrated in FIG. 4, scanning fiber 220 is substantially at rest in a centered position and is blocking approximately half of the light that is emitted by optical source 310 and optical source 330, which, in the absence of the scanning fiber being at the centered position, would be detected by photodetector 320 and photodetector 340, respectively. By placing the optical source/photodetector pairs in an orthogonal orientation with optical sources adjacent each other in adjoining quadrants, light emitted by optical source 310 and subsequently reflected from the scanning fiber is prevented from reaching photodetector 340, which would produce an artifact and, light emitted by optical source 330 and subsequently reflected from the scanning fiber is prevented from reaching photodetector 320. One of ordinary skill in the art would recognize many variations, modifications, and alternatives.

Light from optical source 310 and optical source 330 propagates through channels 410 and 420, respectively. During oscillation of scanning fiber 220, the portion of the scanning fiber present in the space between channels 410 and 412, and channels 420 and 422, will vary. Considering one-dimensional oscillation of scanning fiber 220 in the y-direction, at a centered position, light propagating through channel 410 will be blocked by the scanning fiber. As the amplitude of the scanning fiber oscillation increases, the scanning fiber will move toward channel 420, leaving the optical path between channel 410 and channel 412 unobstructed when the scanning fiber is at the end of the range of motion. Accordingly, light emitted by optical source 310 will be detected by photodetector 320. As the amplitude of the scanning fiber oscillation decreases, the scanning fiber will begin to block light emitted by optical source 310 as it moves toward the centered position, where the maximum amount of light is blocked, and then move toward channel 422, leaving the optical path between channel 410 and channel 412 unobstructed when the scanning fiber is at the end of the range of motion.

Thus, scanning fiber operates as a valve with respect to the light emitted by optical source 310 and optical source 330 reaching photodetector 320 and photodetector 340, respectively. As described more fully herein, by monitoring the light received at photodetector 320 and photodetector 340 as a function of time, the position of the scanning fiber can be determined as a function of time.

Figure 5:
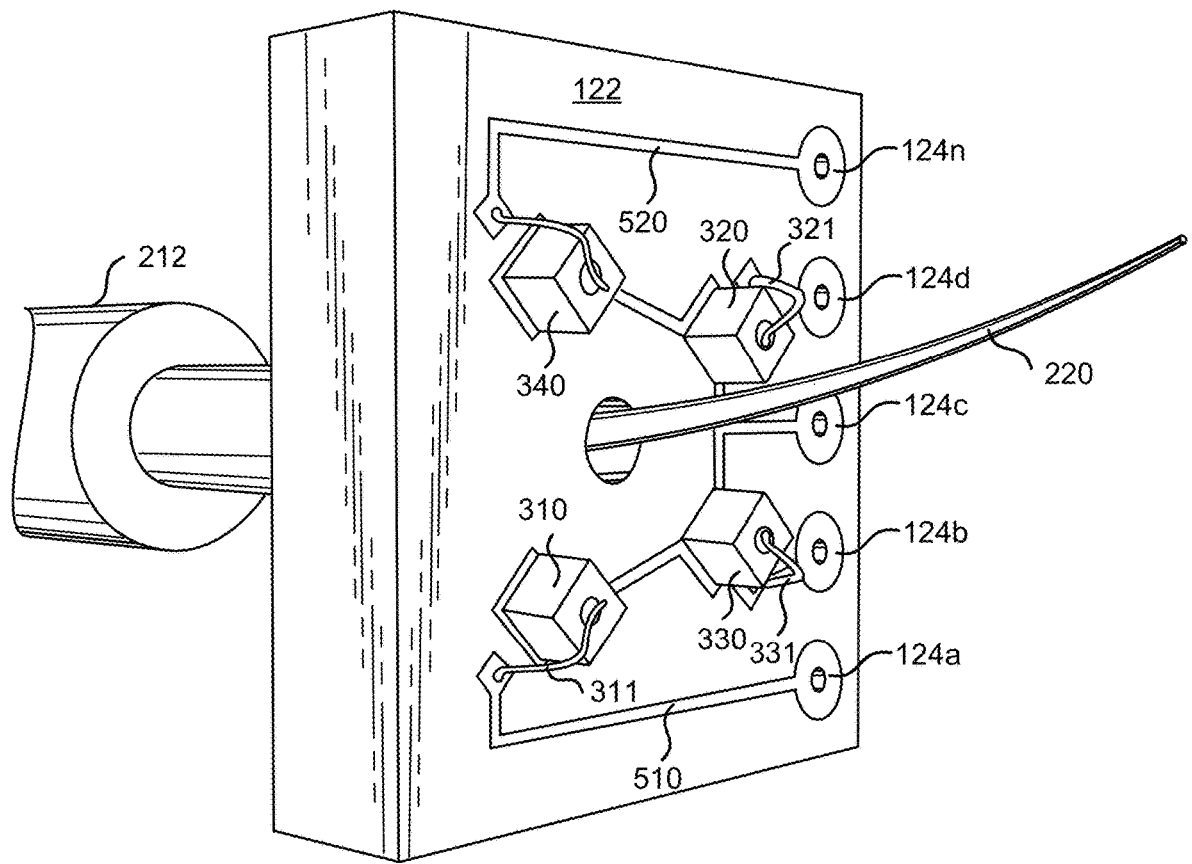
FIG. 5 is a simplified enlarged perspective view illustrating a mounting structure for the light sources and detectors of the fiber position detection system shown in FIG. 3.

FIG. 5 is a simplified enlarged perspective view illustrating a mounting structure for the light sources and detectors of the fiber position detection system shown in FIG. 3. Referring to FIG. 5, PCB 122 is illustrated with orthogonally mounted optical source/photodetector pairs. Optical source 310 emits light directed toward photodetector 320 and optical source 330 emits light directed toward photodetector 340. In order to drive optical source 310, current is provided from electrical connector 124a to optical source 310 through trace 510 and wire bond 311. The signal produced by photodetector 320 is measured at electrical connector 124d. In order to drive optical source 330, current is provided from electrical connector 124b to optical source 330 through a trace (not shown) and wire bond 331. The signal produced by photodetector 340 passes along trace 520 to electrical connector 124e where it is measured. Ground for both the optical sources and the detectors is provided through electrical connector 124c and associated traces.

Although a specific electrical and mechanical structure is illustrated in FIG. 5, with discrete optical sources 310 and 330 and discrete detectors 320 and 340, the present invention is not limited to this particular electrical and mechanical architecture. In other embodiments, integrated elements can be utilized.

In the previous description, the optical source/photodetector pair has been disposed on opposing sides of the scanning fiber; however, this is not required by the present invention. In some embodiments, particularly when the scanning fiber is coated with a reflective coating, the optical source/photodetector pair could be disposed on the same side of the scanning fiber, for example, with the photodetector 320 positioned at the location where optical source 310 is positioned in FIGS. 4 and 5. In these embodiments, light reflected from the scanning fiber would be utilized in determining when the scanning fiber is occluding the collimated beam generated by the optical source. Moreover, implementations in which four sets of co-located optical source/photodetector pairs can be utilized with a reflective scanning fiber. Furthermore, rather than positioning the optical sources on a PCB or other support structure, the optical source could be mounted on the periphery of the scanning fiber, for example, by printing OLEDs on the periphery of the scanning fiber. In this case, as the scanning fiber oscillated, detectors positioned at one or more (e.g., four) lateral locations could be used to detect the amount of light emitted by each of the optical sources, with an increase in the amount of light correlated with the distance from the particular optical source to the corresponding detector. One of ordinary skill in the art would recognize many variations, modifications, and alternatives.

Figure 6:
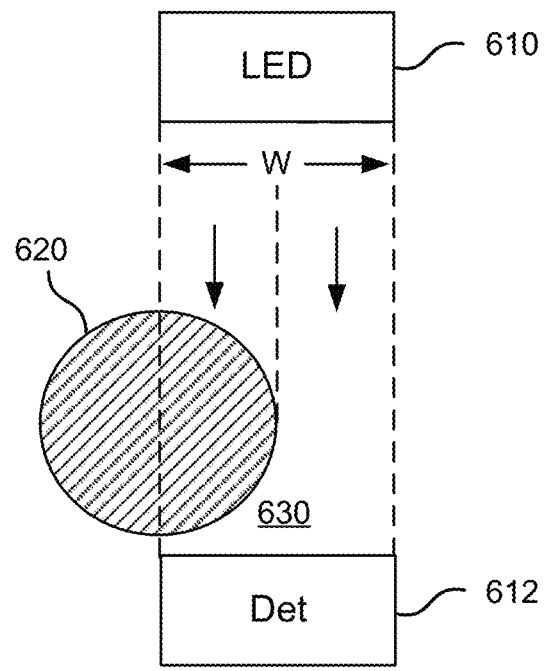
FIG. 6 is a simplified plan view diagram illustrating light propagation for an LED/photodetector pair according to an embodiment of the present invention.

FIG. 6 is a simplified plan view diagram illustrating light propagation for an LED/photodetector pair according to an embodiment of the present invention. In FIG. 6, LED 610 is illustrated as an optical source, but it will be appreciated that other optical sources can be utilized according to embodiments of the present invention. Light emitted from LED 610 is collimated and propagates through channel 630, which can be compared to the first set of channels 410 and 412 in FIG. 4, and impinges on photodetector 612 in the absence of the presence of scanning fiber 620. For purposes of clarity, collimation optics, spectral filters, and the like are not illustrated. For comparison, the plan view illustrated in FIG. 6 is equivalent to the view in the longitudinal z-direction extending from piezoelectric actuator 212 down scanning fiber 220 in FIG. 4.

In the implementation illustrated in FIG. 6, the light from LED 610 propagates with a beam width W, which is matched to the diameter of scanning fiber 620, which can be ~130 μm in some embodiments. At the centered or rest position, the fiber extends half way into the channel such that approximately half of the light emitted by LED 610 is detected by photodetector 612. As the fiber begins to oscillate, for example, along the direction aligned with the beam width W, the detected signal will increase (movement to the left away from the channel) or decrease (movement to the right into the channel) as a result of the motion of the scanning fiber. In most fiber scanning patterns, the scanning fiber is positioned near the centered or rest position for a significant portion of the time during a scanning cycle. If the position of the scanning fiber was such that the scanning fiber was centered in the channel (e.g., moved to the right by the scanning fiber radius), no light would be detected at the detector when the scanning fiber was in the centered or rest position and noise present in the system would impact the measurements of scanning fiber position near the centered or rest position. By positioning the scanning fiber as illustrated in FIG. 6 with half of the emitted light detected when the scanning fiber is in the centered or rest position, signal-to-noise performance is improved significantly. One of ordinary skill in the art would recognize many variations, modifications, and alternatives.

Figure 7:
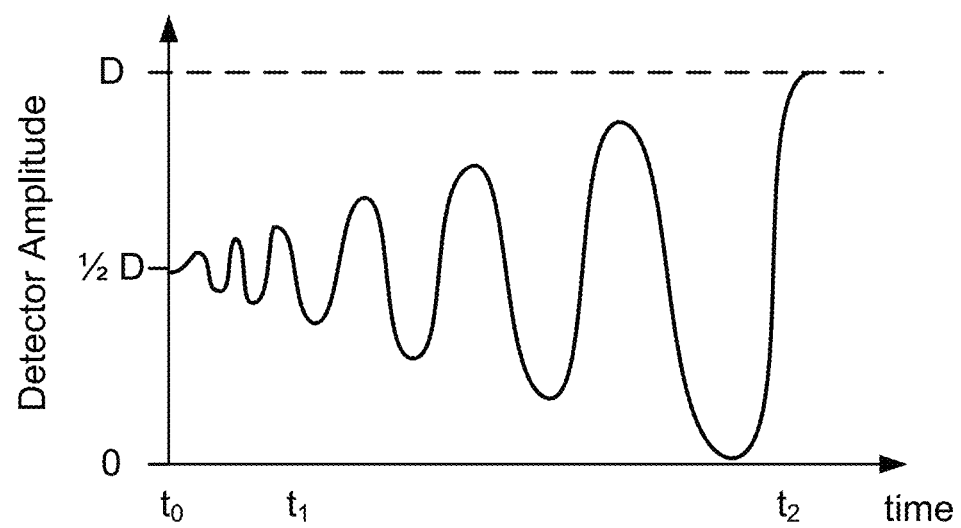
FIG. 7 is a simplified plot illustrating detector signal as a function of time according to an embodiment of the present invention.

FIG. 7 is a simplified plot illustrating the detector signal as a function of time according to an embodiment of the present invention. In this plot, the scanning fiber is positioned at the centered position at time $t_0$. At the centered position, the detector signal is equal to half of the maximum amplitude since half of the emitted light is detected when the scanning fiber is in the centered or rest position as discussed in relation to FIG. 6 in which the scanning fiber is blocking half of the light propagating from the optical source to the photodetector through the connecting channel (or set of channels). As the amplitude of oscillation begins to increase, for example at time $t_1$, the scanning fiber begins to move laterally into and out of the channel (e.g., channel 630 in FIG. 6) and the amount of light detected at the detector begins to oscillate at levels below and below half of the maximum amplitude, respectively. As the amplitude of the oscillation reaches the maximum amplitude, for example, at time $t_2$, the scanning fiber moves laterally to an extent such that the scanning fiber is outside the channel and the amount of light detected at the detector reaches a maximum equal to the maximum detected signal D. When the scanning fiber is positioned in the center of the channel, since the beam width W and the scanning fiber diameter are equal, all of the emitted light is blocked and the detected signal decreases to zero.

In some embodiments, the scanning fiber is coated with a reflective coating, a diffuse coating, an absorbing coating, or the like. Such coatings can prevent light refracted through the fiber from reaching either the matched detector in the optical source/photodetector pair or the photodetector associated with the second optical source/photodetector pair mounted orthogonally to the optical source/photodetector pair of interest. Thus, a coating can be utilized to occlude light incident on the scanning fiber. In some embodiments, calibration is performed to account for refraction of light through the fiber, reflection of light from the fiber, or the like. One of ordinary skill in the art would recognize many variations, modifications, and alternatives.

The plot illustrated in FIG. 7, which is representative of the first of the two optical source/photodetector pairs, will also be produced for the second optical source/photodetector pair mounted orthogonally to the first optical source/photodetector pair. The plot for the second optical source/photodetector pair will be similar in features to that illustrated in FIG. 7, but 90° out of phase. By matching the phase and amplitudes of the detected signal, the motion of the scanning fiber can be determined, for example, if the oscillation traces out a circular spiral pattern or if the spiral pattern has an oval tilt. The fiber position can be tracked throughout the scan pattern, from the small oscillation amplitudes near time $t_0$ to larger amplitudes near time $t_2$. In fact, the resolution of the position detection system described herein is sufficient to detect distortion in the fiber position as a function of time resulting from the change in resonant frequency of the scanning fiber as the amplitude of oscillation changes.

In some embodiments, mechanical characteristics of the scanning fiber are taken into account during operation of the cantilever position detection system. Referring to FIG. 3, the oscillation amplitude of scanning fiber 220 is measured at a position along the shaft of the scanning fiber, whereas the position of the tip of the scanning fiber is the value that is desired. Mechanical characteristics of the scanning fiber can be taken into account and calibration can be performed such that the position of the tip of the scanning fiber can be determined based on the measurements of the position of the scanning fiber as measured along the shaft of the scanning fiber. For example, as mechanical characteristics of the scanning fiber change with temperature, these changes can be addressed during calibration and resulting changes in fiber characteristics can be accounted for to provide desired system accuracy.

The ability to measure scanning fiber position as a function of time will enable the scanning fiber projection system to increase frame rates. In some systems, in order to ensure that the scanning fiber initiates the scanning cycle from a centered or rest position, the fiber is unactuated for a period of time following the scanning cycle. This unactuated period enables the oscillation of the scanning fiber to be damped out over time (i.e., a settling time), decreasing in oscillation amplitude to a predetermined level. However, this unactuated period can adversely impact frame rate as no projection signal is provided to the scanning fiber during the unactuated period. Utilizing embodiments of the present invention to measure the scanning fiber position with high accuracy enables the unactuated period to be decreased in length, thereby increasing frame rate. Furthermore, utilizing the scanning fiber position provided by embodiments of the present invention, the braking time can be decreased.

Moreover, in some embodiments, the scanning cycle can be initiated although the fiber position has not reached the centered or rest position. In these embodiments, the scanning fiber position is measured and the display driver utilizes the scanning fiber position to modify the display data provided to the scanning fiber. One of ordinary skill in the art would recognize many variations, modifications, and alternatives.

Figure 8A:
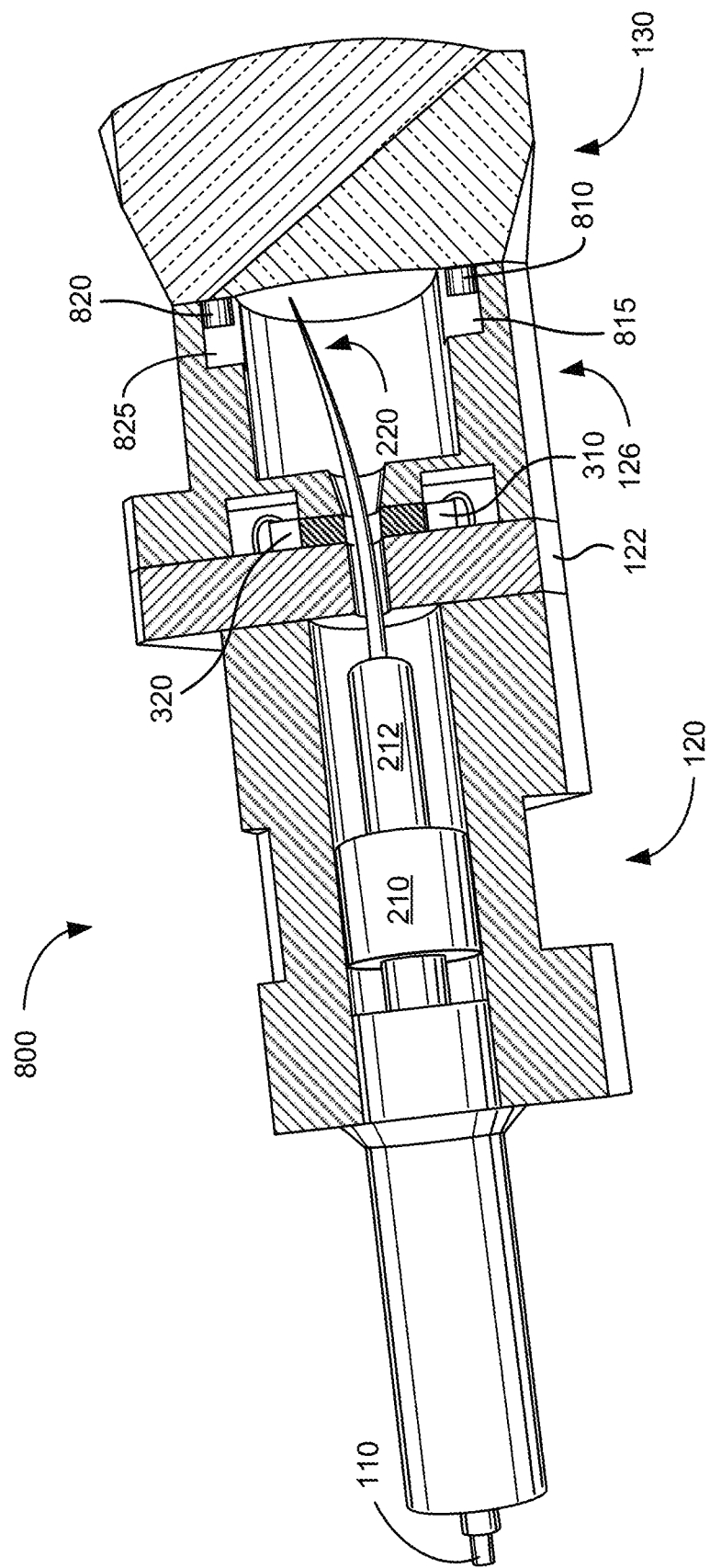
FIG. 8A is a simplified cutaway perspective view illustrating a fiber scanning projector according to another embodiment of the present invention.

FIG. 8A is a simplified cutaway perspective view illustrating a fiber scanning projector according to another embodiment of the present invention. In the fiber scanning projector illustrated in FIG. 8A, two sets of optical source/photodetector pairs are positioned near the tip of scanning fiber 220, which can also be referred to as an emission tip. Thus, embodiments of the present invention can utilize sets of optical source/photodetector pairs that are mounted along the shaft of the scanning fiber, illustrated as mounted on PCB 122, and/or sets of optical source/photodetector pairs that are mounted near the tip of the scanning fiber as illustrated in FIG. 8A.

Referring to FIG. 8A, fiber scanning projector 800 includes optical fiber 110, providing an input to the fiber scanning projector. Chassis 120 provides mechanical support for retention collar 210, which, in turn, provides mechanical support for piezoelectric actuator 212, which is driven by electric signals from wires that are not shown. Scanning fiber 220 passes through piezoelectric actuator 212 and is illustrated in a deflected position. After exiting piezoelectric actuator 212, scanning fiber 220 passes through PCB 122 into an interior region of PCB cover 126. Optical assembly section 130 is mounted to PCB cover 126.

Adjacent optical assembly section 130 near the tip of scanning fiber 220, recesses 815 and 825 are formed in PCB cover 126 to provide mechanical support for optical source 810 and photodetector 820. Optical source 810 and photodetector 820 are disposed laterally with respect to the scanning fiber in a manner similar to optical source 310 and photodetector 320 in FIG. 3. Light emitted by optical source 810 is collimated to form a beam characterized by a beam width and propagating in a direction orthogonal to the longitudinal axis of the scanning fiber when the scanning fiber is in a centered or resting position. In an embodiment, optical source 810 is a semiconductor laser, for example, a vertical-cavity, surface-emitting laser (VCSEL) that is characterized by a collimated output beam. In some implementations, a VCSEL in combination with a ball lens can be utilized to generate a collimated beam. In other embodiments, an edge-emitting laser can be utilized in conjunction with collimating optics to provide a collimated output beam.

As discussed in relation to FIGS. 3-5, photodetector 820 is positioned opposite optical source 810 and operable to receive light emitted by optical source 810. High speed detectors, for example, an InGaAs detector operating at a frequency of 2.5 GHz, or higher, can be utilized. In other embodiments, an LED or a laser diode is utilized as a photodetector. As described herein, as the scanning fiber oscillates, the signal detected at photodetector 820 can be utilized, in conjunction with data collected by an orthogonally mounted optical source/photodetector pair (not shown), to determine the position of the scanning fiber as a function of time.

The operating wavelength of the optical source 810 and the photodetector 820 can be selected as appropriate to the particular application, cost measures, and the like. For example, infrared lasers and detectors, in conjunction with optional spectral filters, can be utilized. In this example, the use of infrared wavelengths for position detection will not result in the generation of visible light, which could scatter into the display optics, impairing system performance. Similarly, visible light utilized in projection will not scatter into the position detection optical system, thereby enabling high signal-to-noise ratio performance. In other embodiments, other wavelengths, including ultraviolet wavelengths, can be utilized. One of ordinary skill in the art would recognize many variations, modifications, and alternatives.

FIG. 8B is a simplified cross-sectional diagram illustrating a scanning fiber in a rest position according to an embodiment of the present invention. FIG. 8C is a simplified cross-sectional diagram illustrating a scanning fiber in maximum deflection positions according to an embodiment of the present invention. In the rest position illustrated in FIG. 8B, scanning fiber 220 is substantially straight from the base to the fiber tip 221. The cross section 850 of the light beam generated by the optical source is illustrated as overlapping with scanning fiber 220 such that the scanning fiber blocks half of cross section 850 of the light beam when the scanning fiber is in the rest position. Accordingly, half of the light beam is transmitted past scanning fiber 220 without being partially or completely blocked by scanning fiber 220.

Referring to FIG. 8C, when the scanning fiber reaches the maximum deflection positions (i.e., maximum "up" deflection position 860 and maximum "down" deflection position 870), a "V" 865 is formed by the fiber motion and a point can be defined at the intersection of the interior surfaces of the scanning fiber in each of these maximum deflection positions. In the maximum "up" deflection position 860, the interior surface is the bottom surface of the scanning fiber and in the maximum "down" deflection position 870, the interior surface is the top surface of the scanning fiber. Although "up" and "down" are illustrated in FIG. 8C, it will be appreciated that these maximum deflection positions are merely exemplary of the maximum deflection positions that are achieved in a pattern that extends 360° in the plane orthogonal to the longitudinal axis of the scanning fiber.

Referring once again to FIGS. 8B and 8C, in the illustrated embodiment, the optical source and photodetector pair are positioned proximal to the "V" intersection 865. The scanning fiber diameter at the "V" intersection position can be used to determine the minimum light beam diameter. The geometry of the light beam diameter and the fiber displacement is such that the fiber displacement, as it oscillates, blocks more or less of the light beam without allowing more than 100% of the light beam to pass (i.e., the fiber moves beyond the light beam) and/or more than 100% of the light beam is blocked (i.e., the fiber moves beyond 100% light beam blockage).

In some embodiments, the optical source and photodetector pair are positioned at a location closer to the base of the scanning fiber than the "V" intersection 865 and in other embodiments, the optical source and photodetector pair are positioned at a location closer to the tip of the scanning fiber than the "V" intersection 865. As an example, when the scanning fiber is characterized by an intersection that is defined by a first surface of the scanning fiber at a first maximum deflection and a second surface of the scanning fiber at a second maximum deflection, which can be referred to as surfaces of the cantilever light source at opposing maximum deflections, the position measurement region can be disposed proximal to the intersection, for instance, if the diameter of the scanning fiber is D, the beam width associated with each of the plurality of optical sources is 2D, and the position measurement region can be disposed within 5D of the intersection. As illustrated in FIG. 8B, in the maximum "up" deflection position 860, the scanning fiber overlaps with cross section 850 of the light beam generated by the optical source, thereby blocking light propagating toward the photodetector. In the maximum "down" deflection position 870, there is no overlap between cross section 850 of the light beam generated by the optical source, thereby enabling light propagating toward the photodetector to pass unobstructed. Accordingly, embodiments of the present invention can monitor the position of the scanning fiber as described herein.

Figure 9A:
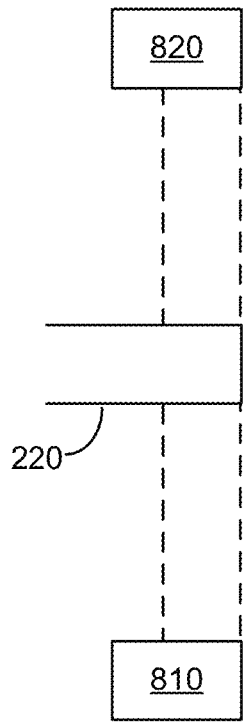
FIG. 9A is a simplified cross-sectional view of an optical source/photodetector pair according to an embodiment of the present invention.

FIG. 9A is a simplified cross-sectional view of an optical source/photodetector pair according to an embodiment of the present invention. In FIG. 9A, optical source 810 and photodetector 820 are illustrated along with the tip of scanning fiber 220. In this illustration, the tip of the scanning fiber at a centered or rest position is aligned with the optical beam produced by optical source 810 and potentially detected by photodetector 820. In other embodiments, the position of the optical source/photodetector pair measured along the longitudinal axis of the scanning fiber is modified to position the optical source/photodetector pair at a position farther up the longitudinal axis of the scanning fiber. Accordingly, the embodiment illustrated in FIG. 9A is merely exemplary and other longitudinal positions are included within the scope of the present invention.

Figure 9B:
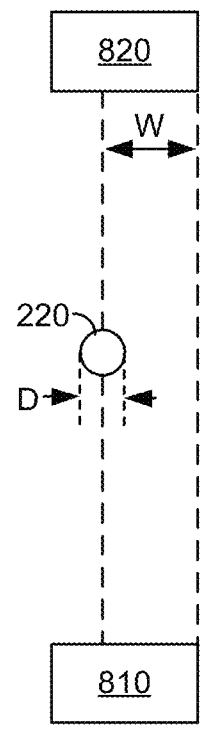
FIG. 9B is a simplified plan view of an optical source/photodetector pair according to an embodiment of the present invention.

FIG. 9B is a simplified plan view of an optical source/photodetector pair according to an embodiment of the present invention. In FIG. 9B, the view is from the perspective of the tip of the scanning fiber, looking toward the piezoelectric actuator 212. Thus, in this view, light emitted by the scanning fiber is directed out of the plane of the figure toward optical assembly section 130, which is disposed above the plane of the figure.

As illustrated in FIG. 9B, the diameter of the tip of scanning fiber 220 is D and the beam width generated by optical source 810 is W. In the embodiment illustrated in FIG. 9B, diameter D is half of beam width W. In contrast, for comparison, in FIG. 6, the diameter of scanning fiber 620 and the beam width W were equal. Because the diameter of the scanning fiber is less than the beam width, the amount of light occluded by the fiber is less than the amount of light emitted by the optical source as discussed more fully in relation to FIG. 10. In an exemplary embodiment, the diameter of the tip of the scanning fiber, which can be a tapered fiber, is on the order of 10 μm. Accordingly, the beam width can be on the order of 20 μm. In other embodiments, the specific values are modified as appropriate to the particular application.

As illustrated in FIG. 9B, at a centered or rest position, scanning fiber 220 is positioned such that the core of the scanning fiber is positioned at the edge of the beam width. Accordingly, ¼ of the beam width is blocked by the scanning fiber and ¾ of the beam width is not occluded by the scanning fiber. In other embodiments, the edge of the scanning fiber can be aligned with the edge of the beam width, or the scanning fiber can be centered on the beam width, with the core of the scanning fiber positioned at the center of the beam width. Thus, the geometry illustrated in FIG. 9B is merely exemplary and does not limit the scope of the present invention.

Figure 10:
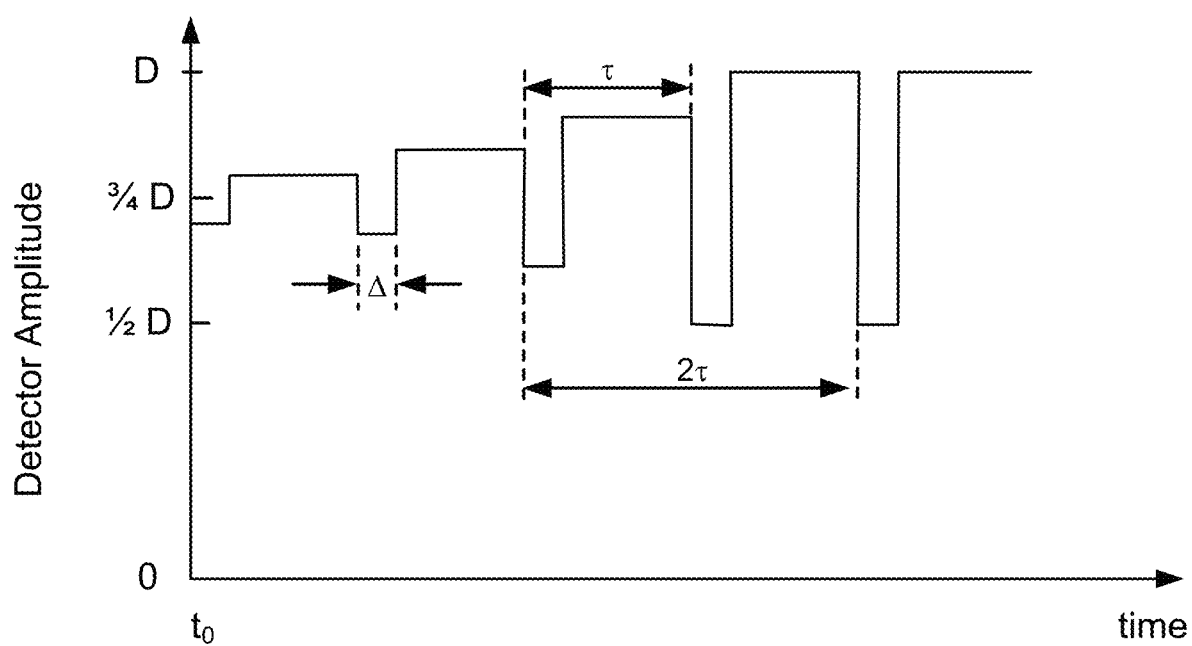
FIG. 10 is a simplified plot illustrating a detector signal as a function of time according to another embodiment of the present invention.

FIG. 10 is a simplified plot illustrating a detector signal as a function of time according to another embodiment of the present invention. Referring to FIG. 10, the scanning fiber is positioned at the centered position at time t0. At the centered position, the detector signal is equal to ¾ of the maximum amplitude. Referring to FIG. 9B, in the implementation in which the scanning fiber diameter is half of the beam width and the core of the scanning fiber aligns with the edge of the beam width, the amount of light occluded by the scanning fiber is ¼ of the light emitted by the optical source. As the amplitude of oscillation begins to increase, the scanning fiber begins to move laterally into and out of the beam width defined by the light emitted by the optical source 810 and the amount of light detected at the detector begins to oscillate at levels below and below ¾ of the maximum amplitude, respectively. As the amplitude of the oscillation reaches the maximum amplitude, the scanning fiber moves laterally to an extent such that the scanning fiber has no overlap with the beam width defined by the light emitted by the optical source 810 and the amount of light detected at the detector reaches a maximum equal to the maximum detected signal D. Since the diameter of the scanning fiber is half of the beam width in this implantation, the minimum detected signal is ½ D, which corresponds to the edges of the scanning fiber being aligned with the right or left edge of the beam width or the scanning fiber being positioned to occlude a portion of the beam width at positions between the right and left edge alignment positions.

Although the slope of the transitions in the detected signal plot is infinite in FIG. 10, it will be appreciated that the transitions will have a finite slope as the fiber moves in and out of the beam width defined by the light emitted by the optical source. Thus, FIG. 10 is merely exemplary and utilized to demonstrate the operating principles of the system.

The time τ in FIG. 10 is the time between the scanning fiber occluding the beam width defined by the light emitted by the optical source 810, with the scanning fiber positioned near the optical source in the optical source/photodetector pair, and the scanning fiber occluding the beam width defined by the light emitted by the optical source 810, with the scanning fiber positioned near the photodetector in the optical source/photodetector pair. Thus, referring to FIG. 8A, when the scanning fiber tip is near optical source 810, occlusion by the scanning fiber results in the detector amplitude decreasing to the minimum value as the fiber passes through the beam width. After time τ, the scanning fiber tip is near photodetector 820 and occlusion by the scanning fiber results in the detector amplitude decreasing to the minimum value as the fiber passes through the beam width adjacent the det. A full oscillation cycle is defined by the time 2τ as the scanning fiber tip returns to be adjacent optical source 810. By using the second optical source/photodetector pair mounted orthogonally to optical source/photodetector pair 810/820 and given the period of oscillation equal to 2τ, the frequency of oscillation can be computed as well as the distance swept out by the tip of the scanning fiber, which can then be used to determine the position of the tip of the scanning fiber. In addition to the oscillation period, the time associated with the scanning fiber occluding the beam width defined by the light emitted by the optical source, represented by Δ in FIG. 10 can be utilized in determining the scanning fiber position.

As discussed in relation to FIGS. 6 and 7, the scanning fiber can be coated with a reflective coating, a diffuse coating, an absorbing coating, or the like. Such coatings can prevent light refracted through the fiber from reaching either the matched detector in the optical source/photodetector pair or the photodetector associated with the second optical source/photodetector pair mounted orthogonally to the optical source/photodetector pair of interest. In some embodiments, since the tip of the scanning fiber is small (e.g., on the order of 10 μm), coatings may not be necessary to achieve desired system performance. In both the embodiments illustrated in FIGS. 6 and 7, as well as FIGS. 8 and 9, if the scanning fiber is uncoated, the scanning fiber can act as a cylindrical lens, focusing light propagating through the scanning fiber. The stripe of light produced by the cylindrical lensing properties of the scanning fiber can then be detected at the photodetector, with a small deflection of the scanning fiber resulting in a large change in the amount of light detected. In particular, this optical implementation can be utilized in conjunction with the user of a semiconductor laser as a detector, with the stripe of light produced by the cylindrical lensing properties of the scanning fiber being aligned with the emission stripe of the semiconductor laser.

The plot illustrated in FIG. 10, which is representative of the first of the two optical source/photodetector pairs, will also be produced for the second optical source/photodetector pair mounted orthogonally to the first optical source/photodetector pair. The plot for the second optical source/photodetector pair will be similar in features to that illustrated in FIG. 10, but 90° out of phase. By matching the phase and amplitudes of the detected signal, the motion of the scanning fiber can be determined, for example, if the oscillation traces out a circular spiral pattern or if the spiral pattern has an oval tilt. The fiber position can be tracked throughout the scan pattern, from the small oscillation amplitudes near time $t_0$ to larger amplitudes. In fact, the resolution of the position detection system described herein is sufficient to detect distortion in the fiber position as a function of time resulting from the change in resonant frequency of the scanning fiber as the amplitude of oscillation changes. Utilizing embodiments of the present invention, the position of the scanning fiber can be determined with high accuracy, for example, within one pixel accuracy, within a half pixel accuracy, within a quarter pixel accuracy, or higher accuracy.

As illustrated in FIG. 8A, embodiments of the present invention can utilize multiple sets of matched optical source/photodetector pairs to enhance the accuracy of scanning fiber position detection. As an example, at low oscillation amplitudes, the matched optical source/photodetector pairs positioned along the shaft of the scanning fiber can be utilized for fiber position detection. At high oscillation amplitudes, the matched optical source/photodetector pairs positioned near the tip of the scanning fiber can be utilized for fiber position detection. In such a multiple set system, mid-level oscillations can utilize data from both sets of optical source/photodetector pairs in a weighted manner. Thus, embodiments can utilize a single set of matched optical source/photodetector pairs or multiple sets as appropriate to the particular application. One of ordinary skill in the art would recognize many variations, modifications, and alternatives.

Figure 11A:
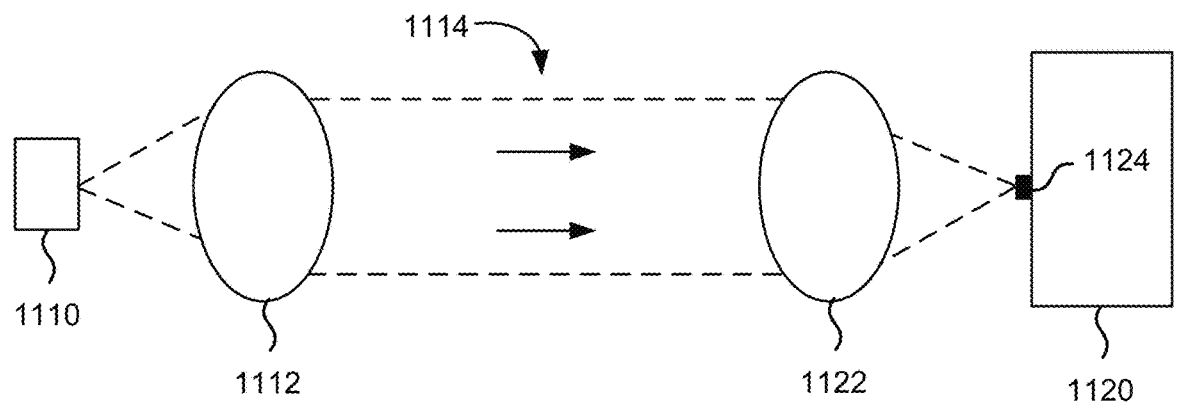
FIG. 11A is a simplified schematic diagram illustrating optical elements that can be utilized with an optical source/photodetector pair according to an embodiment of the present invention.

FIG. 11A is a simplified schematic diagram illustrating optical elements that can be utilized with an optical source/photodetector pair according to an embodiment of the present invention. As illustrated in FIG. 11A, optical source 1110, which can be a semiconductor laser, for example, a VCSEL, emits a diverging beam that is collimated by lens 1112, which can be a ball lens. In other embodiments, a collimated beam is generated using other optical sources and/or optics. Collimated beam 1114 propagates toward photodetector 1120.

Referring to FIG. 11A, in this optical implementation, lens 1122 focuses the collimated beam onto photodetector 1120. In the illustrated embodiment, the focal plane present at the imaging element of photodetector is an image of the emission surface of optical source 1110. Accordingly, an optically opaque element 1124 is positioned at the focal plane of photodetector 1120 to block light emitted from optical source 1110. In the illustrated embodiment, a circular chrome dot is deposited or otherwise attached to photodetector 1120 with dimensions selected such that focusing of the collimated beam 1114 will result in no detector signal being produced. Thus, use of the optically opaque element 1124 can provide a detector signal that is substantially zero in the absence of the scanning fiber partially or fully occluding the collimated beam. It should be noted that embodiments of the present invention can utilize elements illustrated in FIG. 11A without the use of an optically opaque element.

Figure 11B:
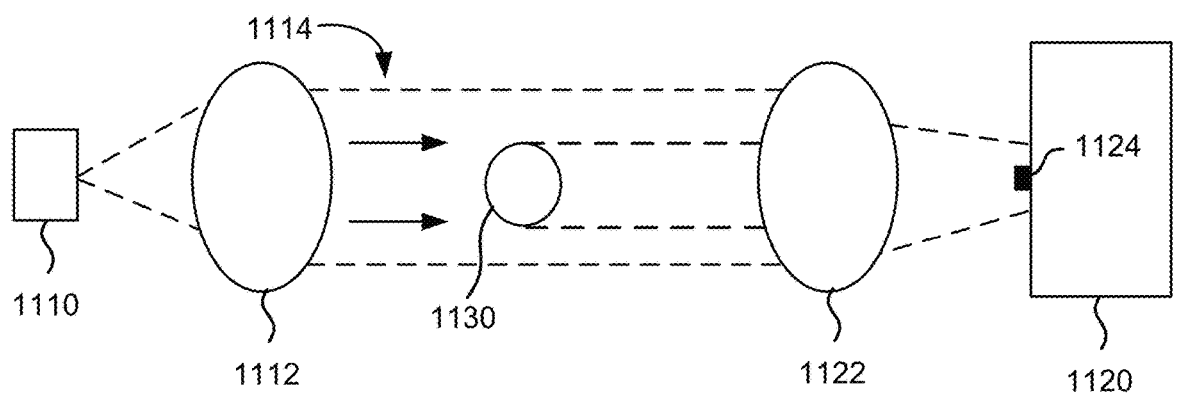
FIG. 11B is a simplified schematic diagram illustrating optical elements that can be utilized with an optical source/photodetector pair in conjunction with an occluding scanning fiber according to an embodiment of the present invention.

FIG. 11B is a simplified schematic diagram illustrating optical elements that can be utilized with an optical source/photodetector pair in conjunction with an occluding scanning fiber according to an embodiment of the present invention. In FIG. 11B, scanning fiber 1130 is illustrated as occluding a portion of the beam width defined by collimated beam 1114. In embodiments in which the scanning fiber is not coated, the amount of light occluded by the scanning fiber may be small since the scanning fiber can be substantially transparent at the wavelengths emitted by the optical source. As described below, the use of optically opaque element 1124 will enhance the light blocking effect resulting from the occlusion of the collimated beam by the scanning fiber.

As the scanning fiber oscillates and occludes the collimated beam, even resulting in a low level of occlusion as a result of the transparency of the scanning fiber, the perturbation of collimated beam 1114 will result in light impinging on the detector at regions not blocked by the optically opaque element 1124. This is illustrated in FIG. 11B by lens 1122 focusing the portion of collimated beam 1114 not occluded by scanning fiber 1130 onto photodetector 1120 with an increased focal spot. Accordingly, in contrast with FIG. 11A, optically opaque element 1124 does not block all the light emitted from optical source 1110, resulting in a detected signal. Thus, as the scanning fiber oscillates and occludes the collimated beam, even when resulting in a low level of occlusion as a result of the transparency of the scanning fiber, the perturbation of collimated beam 1114 will result in light impinging on the detector at regions not blocked by the optically opaque element 1124 and, thereby, producing a detected signal that can be utilized in the scanning fiber position detection systems described herein.

The optical elements and optical source/photodetector pair illustrated in FIG. 11 can be utilized with various embodiments of the present invention, including embodiments operating along the shaft of the scanning fiber as described in relation to FIG. 3 as well as embodiments operating near the tip of the scanning fiber as described in relation to FIG. 8A.

Although lens 1112 and lens 1122 are illustrated as discrete optical elements with respect to optical source 1110 and photodetector 1120, respectively, this is not required by the present invention. In other embodiments, lens 1112 and lens 1122 can be integrated with optical source 1110 and photodetector 1120, respectively. For example, in embodiments utilizing LEDs for optical source 1110 and photodetector 1120, respectively, integrated lenses fabricated in conjunction with the LEDs can be utilized to generate a collimated beam on the emission side and focus light onto the detector on the detection side. Moreover, rather than two lenses, a single lens could be utilized with either optical source 1110 or photodetector 1120.

Figure 12:
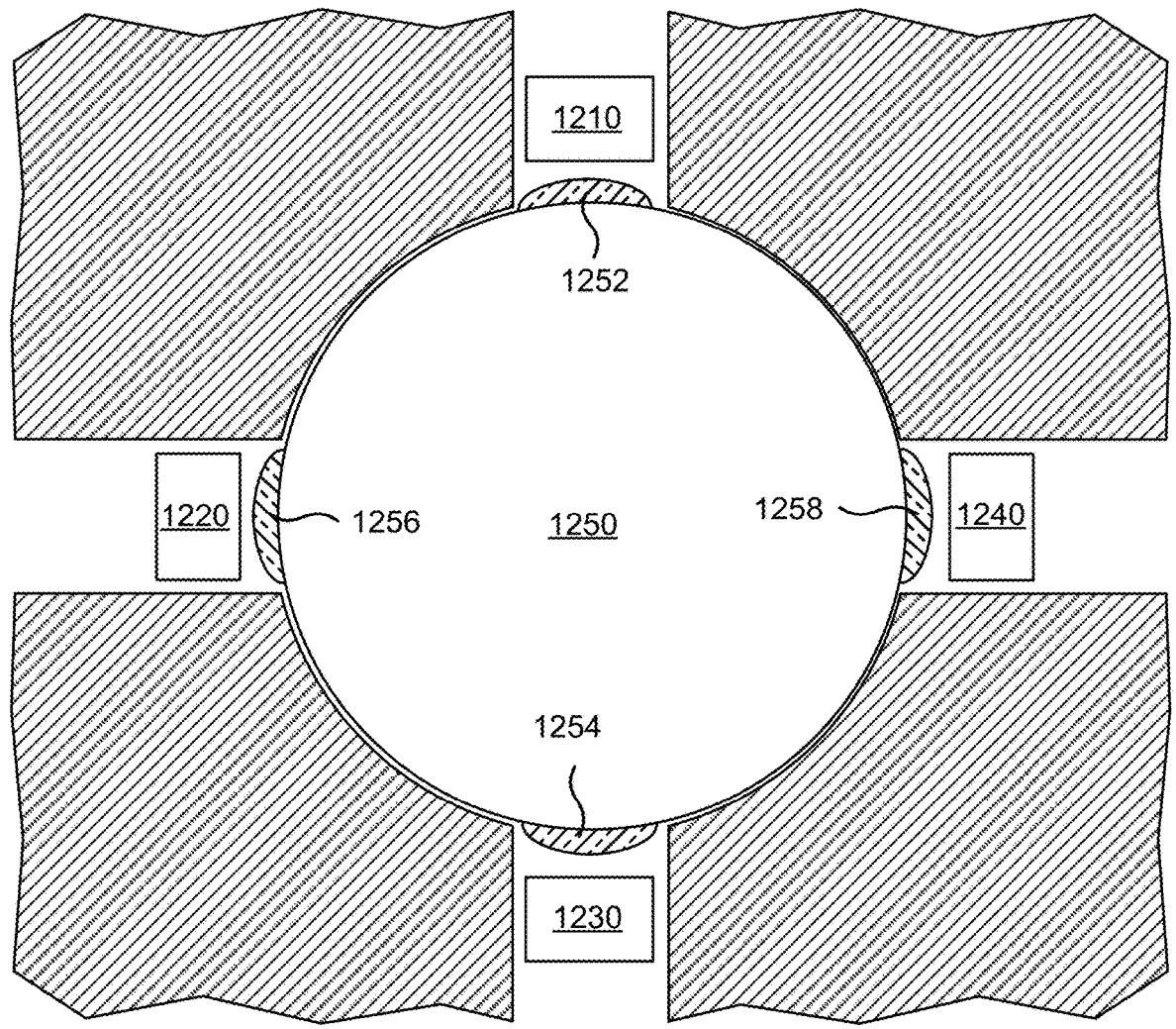
FIG. 12 is a simplified plan view of an integrated lens structure according to an embodiment of the present invention.

FIG. 12 is a simplified plan view of an integrated lens structure according to an embodiment of the present invention. Referring to FIG. 12, an integrated lens assembly 1250 is provided that includes integrated lenses 1252, 1254, 1256, and 1258. Each of the integrated lenses 1252, 1254, 1256, and 1258 is operable to receive light emitted by optical sources 1210 and 1230 and to focus light onto photodetectors 1220 and 1240, respectively. Integrated lens assembly 1250 can be positioned in an orientation in which the plane of the integrated lens assembly is orthogonal to the longitudinal axis of the scanning fiber. Accordingly, optical power can be introduced to elements utilized in the scanning fiber position detection system. A variety of manufacturing techniques can be utilized to fabricate integrated lens assembly 1250 including additive manufacturing, injection molding, and the like.

Referring to FIG. 5, light from optical sources 310, 330 could be collimated by lenses 1252 and 1256 to form two collimated beams propagating toward photodetectors 320 and 340, respectively. Similarly, light in the two collimated beams could be focused by lenses 1254 and 1258 prior to detection using photodetectors 320 and 340. Thus, integrated lens assembly 1250 can be utilized in conjunction with embodiments operating along the shaft of the scanning fiber as described in relation to FIG. 3 as well as embodiments operating near the tip of the scanning fiber as described in relation to FIG. 8A. Although FIG. 12 illustrates integrated lens assembly 1250 as a separate element, it can be molded as part of the same molding process utilized to manufacture other elements of the system, including PCB cover 126. One of ordinary skill in the art would recognize many variations, modifications, and alternatives.

Figure 13:
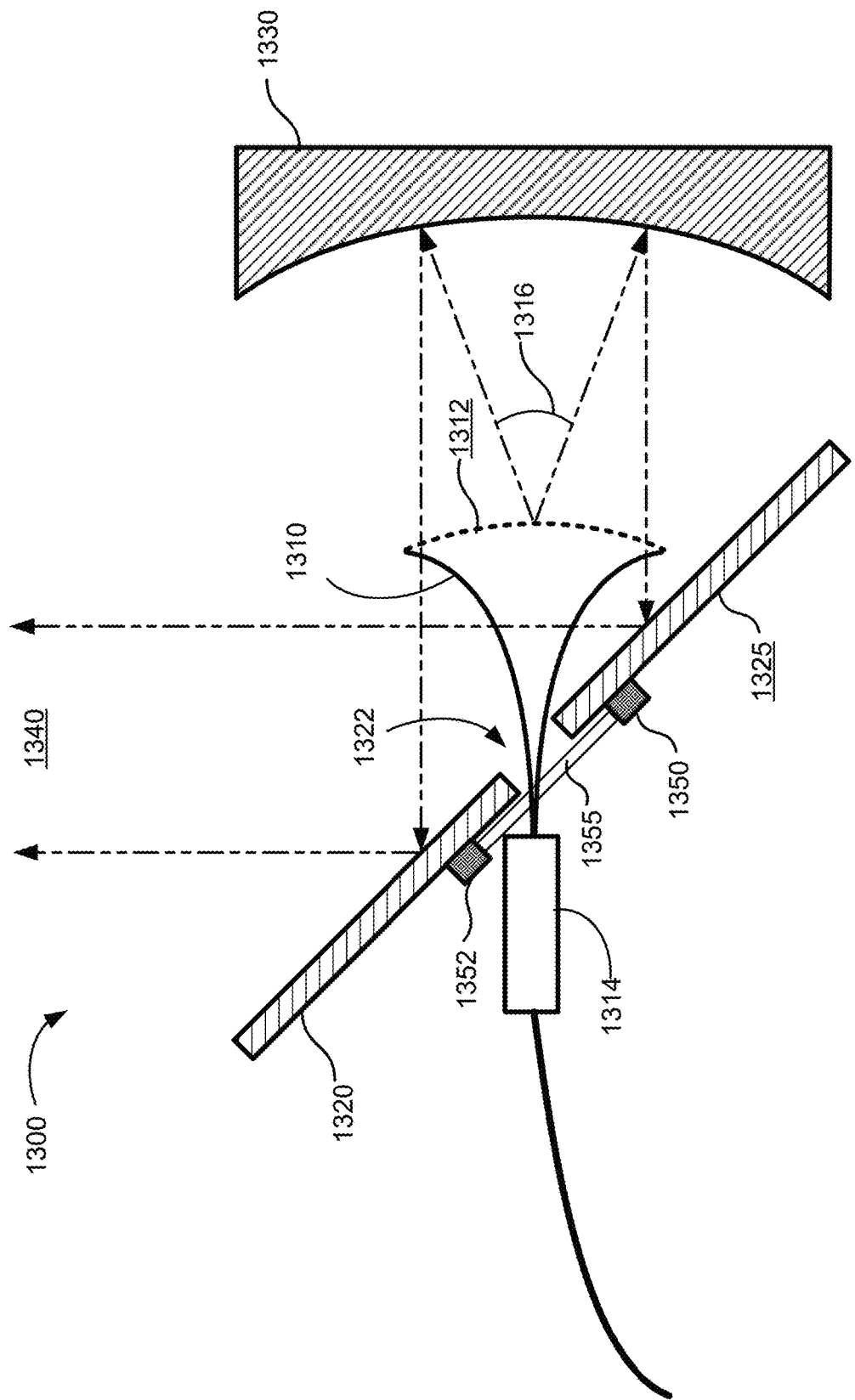
FIG. 13 is a simplified plan view illustrating elements of a fiber position detection system integrated into a fiber scanning projector according to yet another embodiment of the present invention.

FIG. 13 is a simplified plan view illustrating elements of a fiber position detection system integrated into a fiber scanning projector according to yet another embodiment of the present invention. As illustrated in FIG. 13, a scanning fiber 1310 passes through an aperture 1322 in mirror 1320. The scanning fiber is illustrated at the ends of the range of motion. A collimating mirror 1330 reflects light emitted by the scanning fiber, which is then reflected from mirror 1320 to provide output beam 1340. In some embodiments, the radius of curvature of collimating mirror 1330 is twice the radius of curvature of spherical object surface 1312.

As discussed in relation to the fiber scanning projector, as the scanning fiber 1310 is actuated by piezoelectric element 1314, it sweeps out a substantially spherical surface 1312, also referred to as a spherical object surface. Accordingly, after reflection off of a substantially spherical reflector having twice the radius of curvature of the surface swept out by the scanning fiber, light emitted from any point along the surface swept out by the scanning fiber will be well collimated after reflection from the substantially spherical reflector. As the beam is emitted from the tip of the scanning fiber, it fans out to form cone 1316 of light. Additional description related to fiber scanning projector 1300 is provided in U.S. Patent Application Publication No. 2018/0275396, previously referenced above.

In order to measure the position of scanning fiber 1310, an optical source/photodetector pair is utilized as described throughout the specification. In FIG. 13, one of the two sets of matched optical source/photodetector pairs is illustrated and includes optical source 1350 and photodetector 1352. In an embodiment, both optical source 1350 and photodetector 1352 are LEDs. The second set of matched optical source/photodetector pairs would be characterized by an optical path aligned normal to the plane of the figure. In this embodiment, the sets of optical source/photodetector pairs can be integrated with mirror 1320 to form an integrated package. As an example, a PCB similar to that illustrated in FIG. 5 could be fabricated with appropriate optical sources, detectors, and electrical contacts, and bonded to surface 1325 of mirror 1320. In other embodiments, the appropriate optical sources, detectors, and electrical contacts could be integrated with mirror 1320 and fabricated during the fabrication of mirror 1320. For purposes of illustration, collimated beam 1355 is illustrated as being present between optical source 1350 and photodetector 1352. Thus, as scanning fiber 1310 oscillates, the position of the scanning fiber is determined in a manner similar to that discussed with respect to FIGS. 3-5.

In the embodiment illustrated in FIG. 13, the two sets of matched optical source/photodetector pairs are oriented at ~45 with respect to the longitudinal axis of the scanning fiber and this tilting of the plane of the sets of matched optical source/photodetector pairs and the scanning fiber is utilized in determining the position of the scanning fiber. One of ordinary skill in the art would recognize many variations, modifications, and alternatives.

Figure 14:
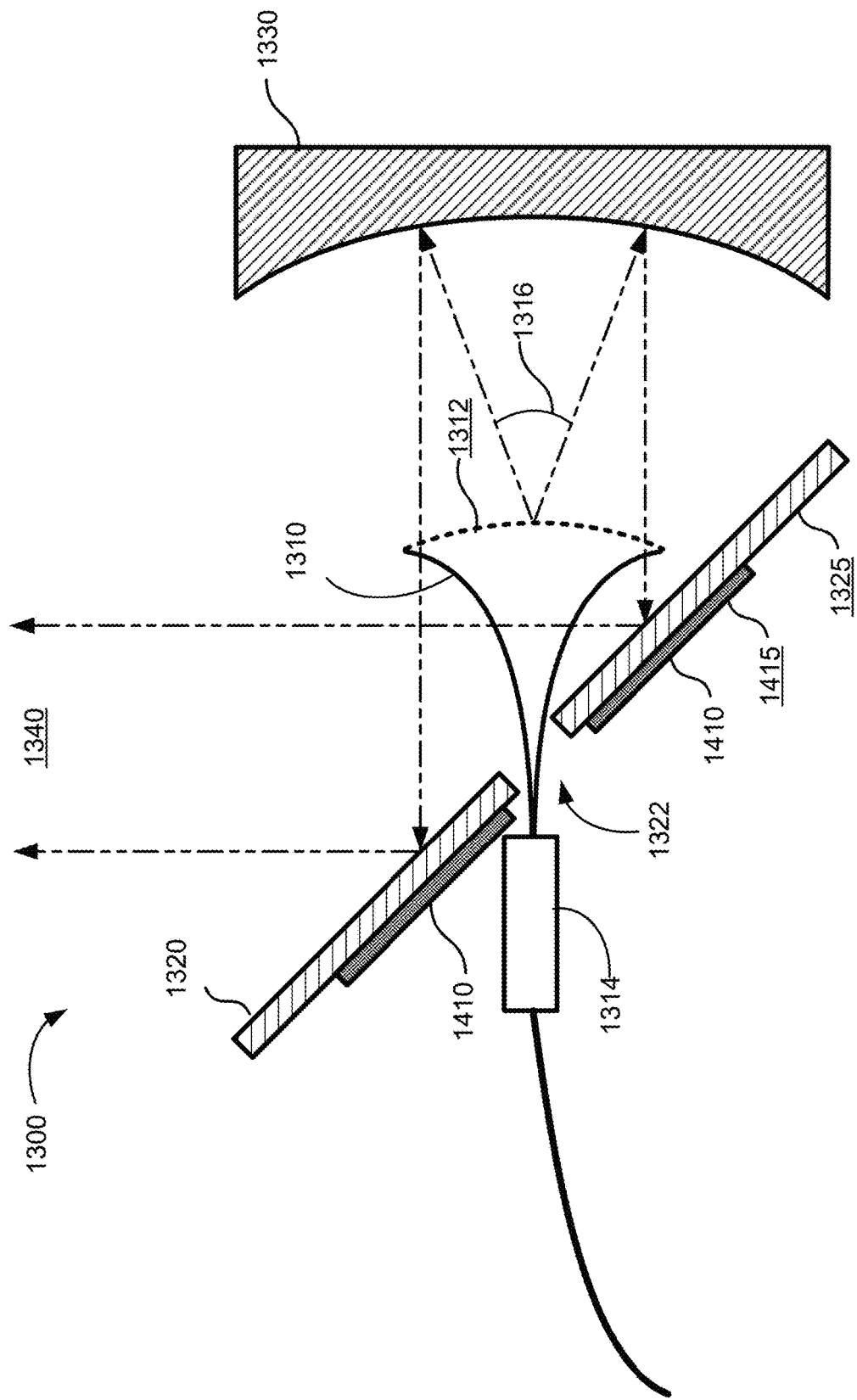
FIG. 14 is a simplified plan view illustrating elements of a position sensor integrated into a fiber scanning projector according to an embodiment of the present invention.

FIG. 14 is a simplified plan view illustrating elements of a position sensor integrated into a fiber scanning projector according to an embodiment of the present invention. The fiber scanning projector illustrated in FIG. 14 shares elements in common with the fiber scanning projector illustrated in FIG. 13 and the discussion provided in relation to FIG. 13 is applicable to FIG. 14 as appropriate.

In the embodiment illustrated in FIG. 14, rather than utilizing two sets of matched optical source/photodetector pairs to determine the position of the scanning fiber, a position sensing diode (PSD) can be utilized in conjunction with the fiber scanning projector. Since a PSD can detect a beam that impinges on the PSD and outputs an (x/y) coordinate position of the incident beam, a PSD can be used to detect the position of the light reflected from collimating mirror 1330 as it is reflected from mirror 1320 to form output beam 1340.

In this embodiment, mirror 1320 is less than 100% reflective so that a portion of the collimated light collimated by collimating mirror 1320 passes through mirror 1320 and is incident on PSD 1410, which is illustrated as having an aperture in the same position as aperture 1322 present in mirror 1320. As the scanning fiber oscillates, resulting in scanning of the output, the position of the scanned output can be measured and the position of the scanning fiber can be determined. In the embodiment illustrated in FIG. 14, PSD 1410 is bonded or otherwise joined to surface 1325 of mirror 1320, but this is not required by the present invention.

Moreover, although the lateral extent of PSD 1410 is smaller than the lateral extent of mirror 1320 for purposes of illustration, this is not required by the present invention and these elements can have the same lateral size. Moreover, although PSD 1410 is illustrated as a discrete element with respect to mirror 1320, this structure could be fabricated by manufacturing the PSD, forming aperture 1322, and then coating the surface of PSD opposing surface 1415 with a partially reflective (e.g., reflectance of 98%) coating. Thus, an integrated structure based on the PSD can be fabricated without the need for mirror 1320. One of ordinary skill in the art would recognize many variations, modifications, and alternatives.

Figure 15:
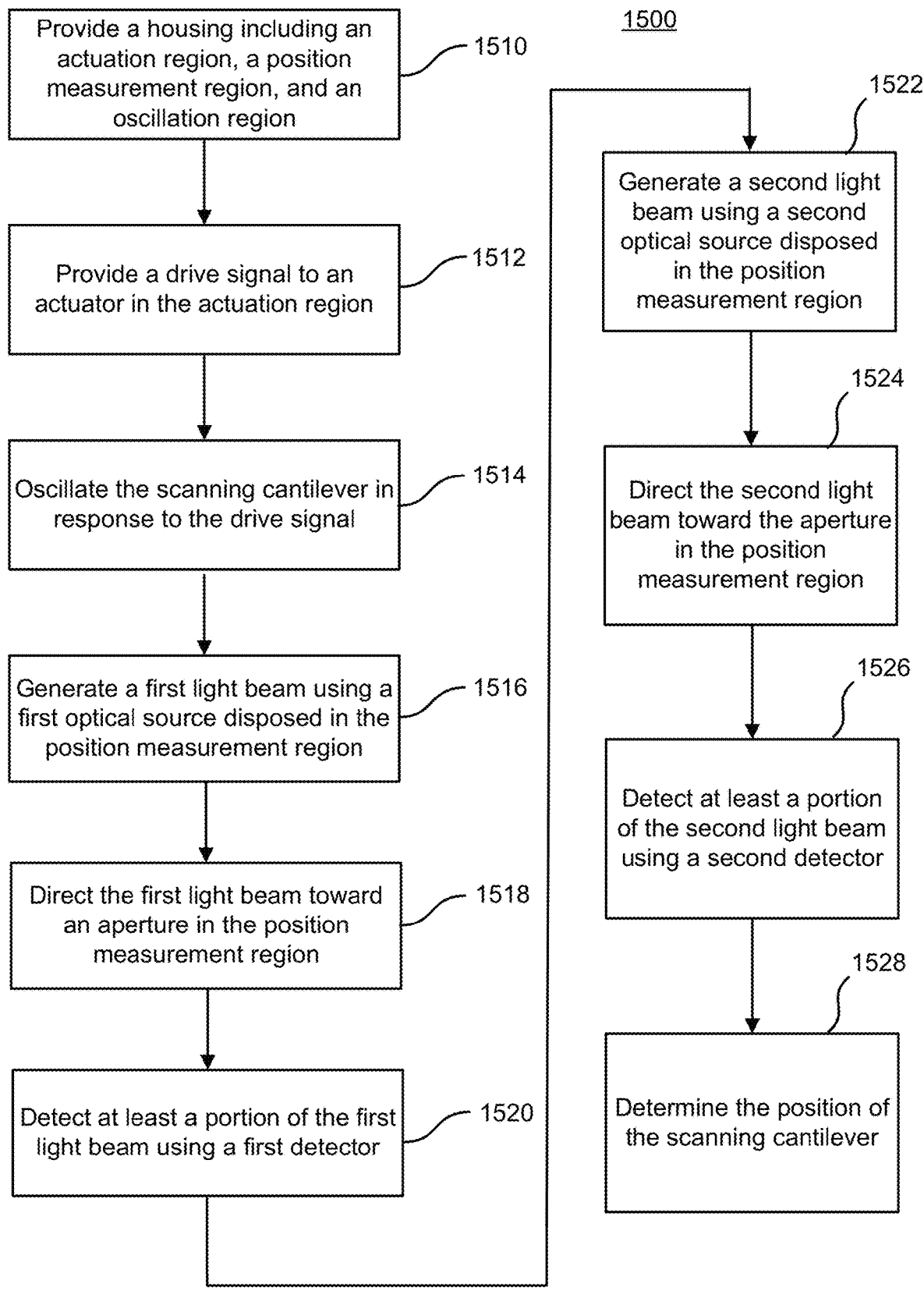
FIG. 15 is simplified flowchart illustrating a method of measuring a position of a scanning cantilever according to an embodiment of the present invention.

FIG. 15 is a simplified flowchart illustrating a method of measuring a position of a scanning cantilever according to an embodiment of the present invention. The method 1500 includes providing a housing including an actuation region, a position measurement region including an aperture, and an oscillation region (1510). The scanning cantilever extends from the actuation region through the aperture in the position measurement region to the oscillation region (1510). The scanning cantilever can be a scanning fiber that includes a reflective or absorbing coating. In these embodiments, the scanning fiber can be characterized by a longitudinal axis and the first optical source, the first photodetector, the second optical source, and the second photodetector can be disposed in a lateral plane orthogonal to the longitudinal axis. The method also includes providing a drive signal to an actuator disposed in the actuation region (1512) and oscillating the scanning cantilever in response to the drive signal (1514).

The method further includes generating a first light beam using a first optical source disposed in the position measurement region (1516), directing the first light beam toward the aperture in the position measurement region (1518), and detecting at least a portion of the first light beam using a first detector (1520). Moreover, the method includes generating a second light beam using a second optical source disposed in the position measurement region (1522), directing the second light beam toward the aperture in the position measurement region (1524), detecting at least a portion of the second light beam using a second detector (1526), and determining the position of the scanning cantilever based on the detected portion of the first light beam and the detected portion of the second light beam (1528). The first optical source, the first detector, the second optical source, and the second photodetector can be light emitting diodes. In another embodiment, the first optical source and the second optical source are light emitting diodes and the first photodetector and the second photodetector are photodiodes.

In an embodiment, directing the first light beam toward the aperture comprises propagating the first light beam in a first channel and directing the second light beam toward the aperture comprises propagating the second light beam in a second channel. A printed circuit board can be disposed in the position measurement region and the first optical source, the first photodetector, the second optical source, and the second photodetector can be mounted on the printed circuit board.

It should be appreciated that the specific steps illustrated in FIG. 15 provide a particular method of measuring a position of a scanning cantilever according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 16:
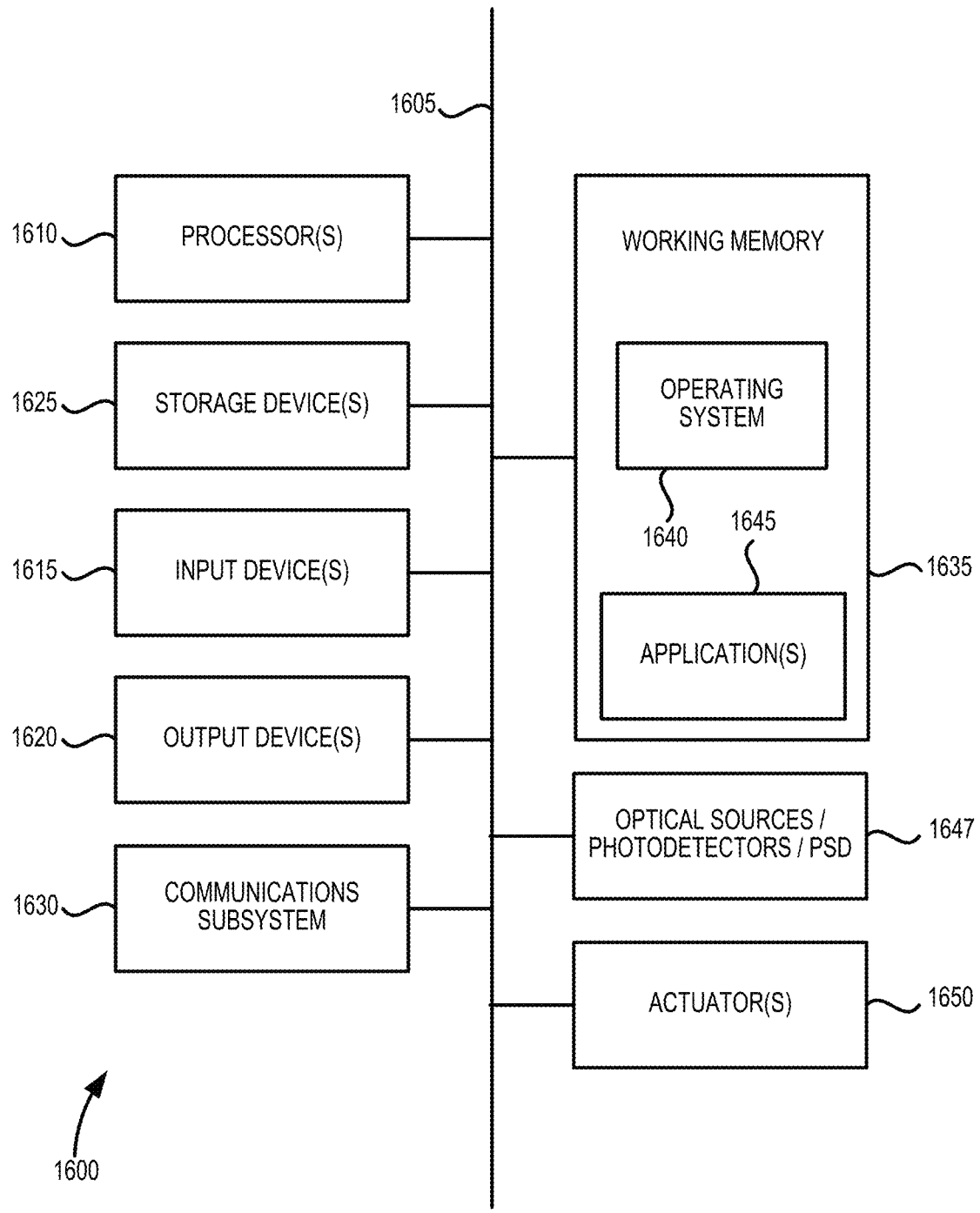
FIG. 16 is a simplified schematic diagram of a control system according to an embodiment of the present invention.

FIG. 16 is a simplified schematic diagram of a computer system according to an embodiment of the present invention. Computer system 1600 as illustrated in FIG. 16, which may also be referred to as a control system, may include one more computing devices and may be incorporated into devices such as the cantilever scanning (e.g., fiber scanning) projectors described herein. FIG. 16 provides a schematic illustration of one embodiment of a computer system 1600 that can perform some or all of the steps of the methods provided by various embodiments. It should be noted that FIG. 16 is meant only to provide a generalized illustration of various components, any or all of which may be utilized as appropriate. FIG. 16, therefore, broadly illustrates how individual system elements may be implemented in a relatively separated or relatively more integrated manner.

Computer system 1600 can be utilized to drive actuator(s) 1650 and optical sources, photodetectors, PSDs 1647 to generate as well as receive measured signals. For example, generation of a scanning pattern and subsequent of measured optical signals as illustrated in FIGS. 7 and 10 can be implemented using computer system 1600.

The computer system 1600 is shown comprising hardware elements that can be electrically coupled via a bus 1605, or may otherwise be in communication, as appropriate. The hardware elements may include one or more processors 1610, including without limitation one or more general-purpose processors and/or one or more special-purpose processors such as digital signal processing chips, graphics acceleration processors, and/or the like; one or more input devices 1615, which can include without limitation a mouse, a keyboard, a camera, and/or the like; and one or more output devices 1620, which can include without limitation a display device, a printer, and/or the like.

The computer system 1600 may further include and/or be in communication with one or more non-transitory storage devices 1625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1600 might also include a communications subsystem 1630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1630. In other embodiments, a portable electronic device, e.g., the first electronic device, may be incorporated into the computer system 1600, e.g., an electronic device as an input device 1615. In some embodiments, the computer system 1600 will further comprise a working memory 1635, which can include a RAM or ROM device, as described above.

The computer system 1600 also can include software elements, shown as being currently located within the working memory 1635, including an operating system 1640, device drivers, executable libraries, and/or other code, such as one or more application programs 1645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 16, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1625 described above. In some cases, the storage medium might be incorporated within a computer system, such as computer system 1600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1600 and/or might take the form of source and/or installable code, which, upon compilation and/or installation on the computer system 1600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1600 to perform methods in accordance with various embodiments of the technology. According to a set of embodiments, some or all of the procedures of such methods are performed by the computer system 1600 in response to processor 1610 executing one or more sequences of one or more instructions, which might be incorporated into the operating system 1640 and/or other code, such as an application program 1645, contained in the working memory 1635. Such instructions may be read into the working memory 1635 from another computer-readable medium, such as one or more of the storage device(s) 1625. Merely by way of example, execution of the sequences of instructions contained in the working memory 1635 might cause the processor(s) 1610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1600, various computer-readable media might be involved in providing instructions/code to processor(s) 1610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1625. Volatile media include, without limitation, dynamic memory, such as the working memory 1635.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1600.

The communications subsystem 1630 and/or components thereof generally will receive signals, and the bus 1605 then might carry the signals and/or the data, instructions, etc. carried by the signals to the working memory 1635, from which the processor(s) 1610 retrieves and executes the instructions. The instructions received by the working memory 1635 may optionally be stored on a non-transitory storage device 1625 either before or after execution by the processor(s) 1610.

Figure 17:
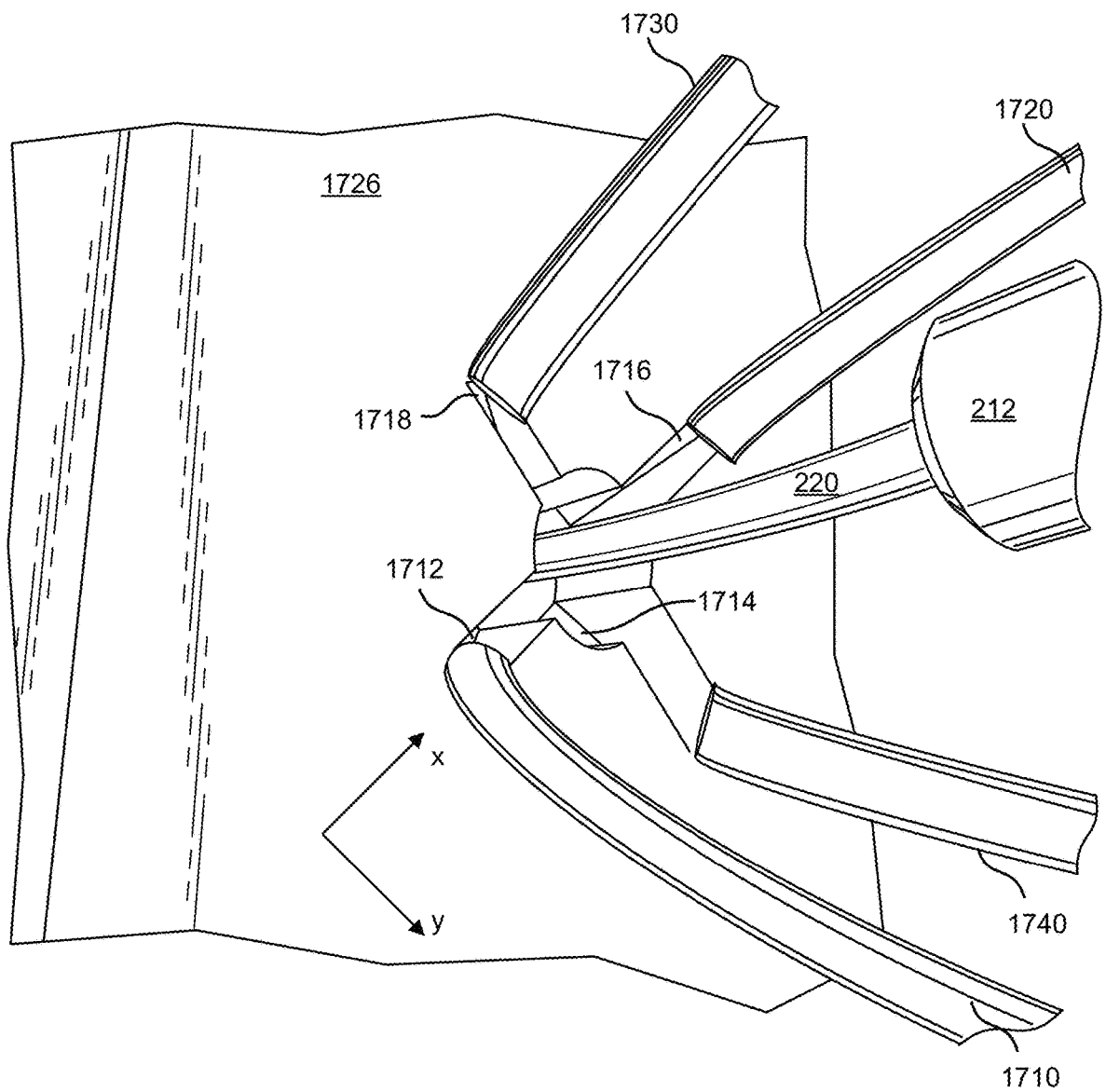
FIG. 17 is a simplified enlarged perspective view illustrating another implementation of a fiber position detection system with optical fiber pairs according to an embodiment of the present invention.

FIG. 17 is a simplified enlarged perspective view illustrating another implementation of a fiber position detection system with optical fiber pairs according to an embodiment of the present invention. In comparison with the embodiment illustrated in FIG. 3, FIG. 17 illustrates an embodiment of the present invention in which light from an optical source is conducted to a photodetector via a pair of optical fibers, rather than by mounting an optical source/detector pair directly to a PCB (e.g., PCB 122 in FIG. 1). As described in more detail below, optical fiber pairs conduct light to reflectors that are disposed on opposing sides of a central aperture, also referred to as an aperture, through which a scanning fiber passes. Referring to FIG. 17, scanning fiber 220 passes through a central aperture around which four optical fibers are positioned. In FIG. 17, a portion of substrate 1726 is illustrated, with reflectors 1712, 1714, 1716, and 1718 provided to conduct light from optical source fibers 1710 and 1730 along optical paths to optical receiver fibers 1720 and 1740, respectively, as described in more detail in reference to FIGS. 18A-18C, below. In the perspective view illustrated in FIG. 17, which is from the perspective taken looking from the piezoelectric actuator 212 toward the tip of scanning fiber 220, a collar within which optical fibers 1710, 1720, 1730, and 1740 are disposed has been removed for purposes of clarity. This collar is described in more detail in reference to FIG. 19, below.

Optical source fiber 1710 and optical receiver fiber 1720 are disposed at positions along the x-axis with an optical path joining optical source fiber 1710 and optical receiver fiber 1720. Similarly, optical source fiber 1730 and optical receiver fiber 1740 are disposed at positions along the y-axis with a second optical path joining optical source fiber 1730 and optical receiver fiber 1740. Thus, the two optical fiber pairs have respective optical paths that are orthogonal to each other. Although the optical source fiber and optical receiver fiber pairs are illustrated as aligned with the x-axis and y-axis, the optical source fiber and optical receiver fiber pairs can be oriented at different angles with respect to these axes in other orthogonal orientations. One of ordinary skill in the art would recognize many variations, modifications, and alternatives.

In the embodiment illustrated in FIG. 17, scanning fiber 220 is substantially at rest in a centered position and is blocking approximately half of the light that is emitted by optical source fiber 1710 and optical source fiber 1730, which, in the absence of the scanning fiber being at the centered position, would be detected by optical receiver fiber 1720 and optical receiver fiber 1740, respectively. By placing the optical fiber pairs in an orthogonal orientation with optical sources adjacent each other in adjoining quadrants, light emitted by optical source fiber 1710 and subsequently reflected from the scanning fiber is prevented from reaching optical receiver fiber 1740, and light emitted by optical source fiber 1730 and subsequently reflected from the scanning fiber is prevented from reaching optical receiver fiber 1720, thereby providing position information related to scanning fiber 220.

Light from optical source fiber 1710 reflects along paired reflectors 1712 and 1716, whereas light from optical source fiber 1730 reflects along paired reflectors 1714 and 1718, both of which are also illustrated in FIGS. 18A-18C. Paired reflectors 1712, 1716, 1714, and 1718 also can be referred to as reflective optics. During oscillation of scanning fiber 220, the portion of the scanning fiber present in the space between reflectors 1712 and 1716, and reflectors 1714 and 1718, will vary. Considering one-dimensional oscillation of scanning fiber 220 in the y-direction, at a centered position, all or a portion of light propagating between reflectors 1712 and 1716 will be blocked by scanning fiber 220. As the amplitude of the scanning fiber oscillation increases, scanning fiber 220 will move toward reflector 1714, leaving the optical path between reflectors 1712 and 1716 partially or wholly unobstructed when scanning fiber 220 is at the end of the range of motion. Accordingly, light emitted by optical source fiber 1710 will be detected by a detector that is optically coupled to optical receiver fiber 1720.

As the amplitude of the scanning fiber oscillation decreases, the scanning fiber 220 will begin to block light or increase the amount of light blocked after emission from optical source fiber 1710 as it moves toward and through the centered position and then toward reflector 1718. As the scanning fiber reaches a point closest to reflector 1714, the optical path between reflector 1712 and 1716 will become partially or wholly unobstructed when the scanning fiber is at the end of the range of motion.

Thus, scanning fiber 220 operates as a valve with respect to the light emitted by optical source fiber 1710 and optical source fiber 1730 reaching optical receiver fiber 1720 and optical receiver fiber 1740, respectively. As described more fully herein, by monitoring the light received at optical receiver fiber 1720 and optical receiver fiber 1740 as a function of time, the position of the scanning fiber can be determined as a function of time.

FIG. 18A is a simplified enlarged perspective view illustrating an implementation of a fiber position detection system with a substrate including reflectors according to an embodiment of the present invention. In FIG. 18A, substrate 1726 is shown without optical fiber pairs to provide a simplified view of paired reflectors 1712/1716 and 1714/1718. As described in reference to FIG. 17, substrate 1726 includes one or more pairs of reflectors disposed on a surface of substrate 1726. Substrate 1726 includes central aperture 1805 through which the scanning fiber (e.g., scanning fiber 220 of FIG. 17) extends along longitudinal axis 1810. In the illustrated embodiment, central aperture 1805 is centered on longitudinal axis 1810.

In FIG. 18A, two axes, "x" and "y," are shown. Arranged on opposing sides of central aperture 1805 are paired reflectors 1712 and 1716 along the x-axis, and paired reflectors 1714 and 1718 along the y-axis. This arrangement, in conjunction with optical source fiber 1710 and optical source fiber 1730, creates two orthogonal light beams crossing central aperture 1805. In the illustrated embodiment, the two orthogonal light beams cross central aperture 1805 at a position offset from longitudinal axis 1810, which is coincident with the rest position of scanning fiber 220. This offset permits measurements as described in reference to FIGS. 20-21, below.

In some embodiments, substrate 1726 is formed from a single piece of material of which the paired reflectors are surface facets. For example, substrate 1726 may be formed from a metal (e.g., aluminum, brass, etc.) having at least one surface being machined to include angled surface facets forming the paired reflectors, wherein the angled surface facets bear a mirror-polish for reflecting incident light. Similarly, a reflective film and/or coating may be deposited onto the angled surfaces to provide or enhance the reflectivity. Alternatively, mirrors fashioned from optical materials (e.g., optical glass) may be disposed on the angled surfaces. One of ordinary skill in the art would recognize many variations, modifications, and alternatives.

FIG. 18B is a simplified enlarged plan view illustrating an implementation of a fiber position detection system with a substrate including reflectors according to an embodiment of the present invention. FIG. 18B illustrates central aperture 1805 of substrate 1726, paired reflectors 1712 and 1716 aligned parallel to the x-axis, and paired reflectors 1714 and 1718 aligned parallel to the y-axis, as described in reference to FIG. 18A, above. The offset of paired reflectors relative to longitudinal axis 1810 of central aperture 1805 (i.e., out of the plane illustrated in FIG. 18B) is shown, such that light beams reflected between paired reflectors cross at a position above, and to the right of the center of central aperture 1805 of substrate 1726. Similarly, paired reflectors may be positioned such that the location at which the light beams cross relative to the longitudinal axis of the central aperture is selected, for example, so that the measurement conditions described in reference to FIGS. 20-21, below, are satisfied.

FIG. 18C is a simplified enlarged cross-sectional view illustrating another implementation of a fiber position detection system with a substrate including reflectors according to an embodiment of the present invention. FIG. 18C provides a cross-sectional view of substrate 1726, as described in more detail in reference to FIG. 22, below. Substrate 1726 includes paired reflective surfaces 1812 and 1816 oriented along the x-axis, as described above. FIG. 18C also shows reflective surface 1818, which is paired with reflective surface 1814 (not shown), oriented in an opposing position along the y-axis (out of the plane). As described in more detail in reference to FIG. 18C, the reflective surfaces may be polished surfaces of substrate 1726, deposited reflective films or coatings, reflective optics, or the like. One of ordinary skill in the art would recognize many variations, modifications, and alternatives.

The z-axis shown in FIG. 18C is aligned with longitudinal axis 1810, which is aligned with the axis of the scanning fiber (e.g., scanning fiber 220 of FIG. 17) at its resting position. As illustrated in FIG. 18A, substrate 1726 may be formed to include a groove (e.g., groove 1728) for each reflective surface so that light propagating in the groove can be constrained as it propagates from the optical source fiber to the optical receiver fiber. As described in more detail in reference to FIG. 4, the grooves may serve a similar purpose to the recesses (e.g., recesses 315, 325, 335, 345 of FIG. 4) for isolating optical fiber pairs from each other and reducing cross-talk between optical fiber pairs. One of ordinary skill in the art would recognize many variations, modifications, and alternatives.

Figure 19:
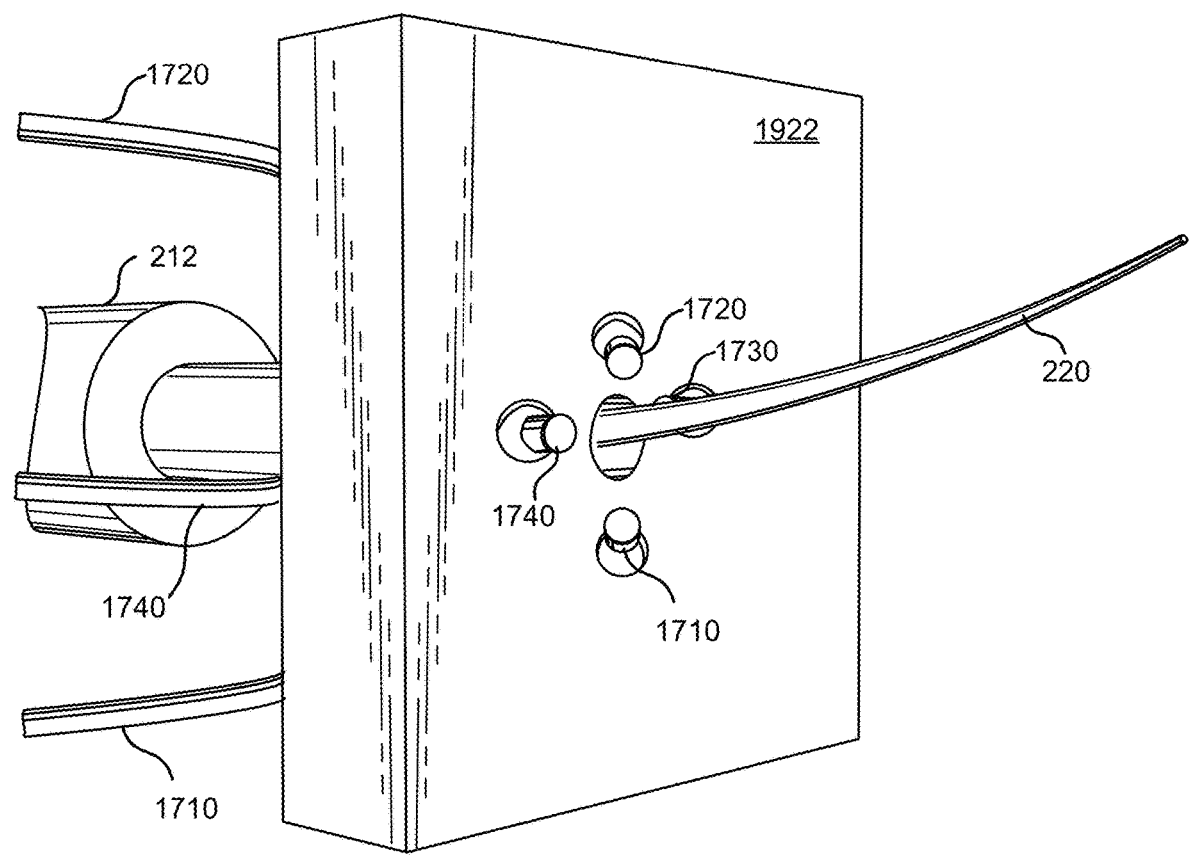
FIG. 19 is a simplified enlarged perspective view illustrating a mounting structure for the optical fiber pairs of the fiber position detection system shown in FIG. 17.

FIG. 19 is a simplified enlarged perspective view illustrating a mounting structure for the optical fiber pairs of the fiber position detection system shown in FIG. 17. Collar 1922 is illustrated with orthogonally oriented optical fiber pairs. Optical source fiber 1710 emits light directed toward a substrate having paired reflectors (e.g., reflectors 1712 and 1716 of FIG. 16) that conduct light to optical receiver fiber 1720 and optical source fiber 1730 emits light directed toward the substrate, to be conducted toward optical receiver fiber 1740 by different paired reflectors. In reference to FIG. 3, in contrast to paired optical sources and detectors mounted to a PCB, in some embodiments, substrate 1726 may not include electronics or wiring, and may not generate electrical signals directly. Instead, light conducted between the optical fiber pairs may be measured by photodetectors in optical communication with the optical receiver fibers 1720 and 1740, respectively, remote from the scanning fiber 220, as described in more detail in reference to FIGS. 23A-23C, below.

Although a specific collar structure is illustrated in FIG. 19 (e.g., collar 1922), with discrete optical source fibers 1710 and 1730 and discrete optical receiver fibers 1720 and 1740, the present invention is not limited to this particular architecture. In other embodiments, integrated elements can be utilized. For example, optical source fibers 1710 and 1730 may be formed by splicing a single optical source fiber. Alternatively, a single optical source fiber may provide light for multiple optical receiver fibers by optics integrated into collar 1922 (e.g., an optical waveguide integrated into the collar receiving a single optical source fiber).

In the previous description, the optical fiber pairs have been disposed on opposing sides of the scanning fiber; however, this is not required by the present invention. In some embodiments, particularly when the scanning fiber is coated with a reflective coating, the optical fiber pairs could be disposed on the same side of the scanning fiber, for example, with the optical receiver fiber 1720 positioned at the location where optical source fiber 1710 is positioned in FIGS. 17 and 19. In these embodiments, light reflected from the scanning fiber would be utilized in determining when the scanning fiber is occluding the collimated beam provided by the optical source fiber 1710. Moreover, embodiments of the present invention include implementations in which four sets of co-located optical fiber pairs can be utilized with a reflective scanning fiber. Furthermore, rather than providing optical source fibers, one or more optical sources could be mounted on the periphery of the scanning fiber, for example, by printing OLEDs on the periphery of the scanning fiber. In this case, as the scanning fiber oscillates, optical receiving fibers positioned at one or more (e.g., four) lateral locations could be used to detect the amount of light emitted by each of the optical sources, with an increase in the amount of light correlated with the distance from the particular optical source to the corresponding detector. One of ordinary skill in the art would recognize many variations, modifications, and alternatives.

Figure 20:
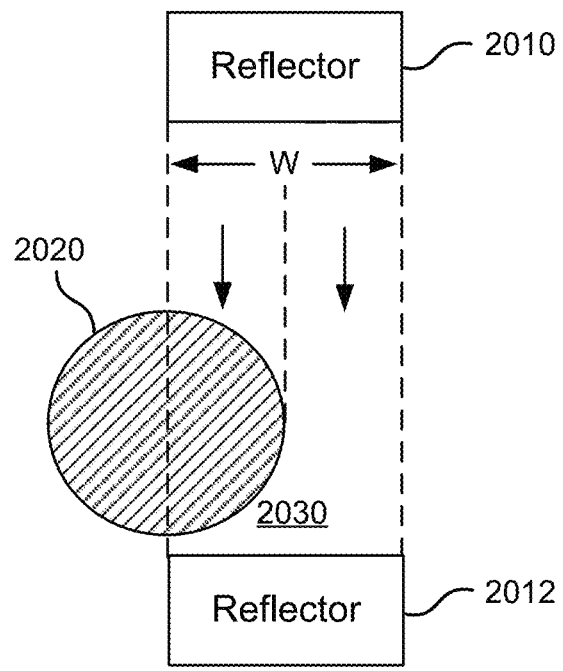
FIG. 20 is a simplified plan view diagram illustrating light propagation for a reflector pair according to an embodiment of the present invention.

FIG. 20 is a simplified plan view diagram illustrating light propagation for a reflector pair according to an embodiment of the present invention. In FIG. 20, reflector 2010 is illustrated as an optical source. Light provided to reflector 2010 from an optical source fiber (e.g., optical source fiber 1710 of FIG. 17) is collimated and propagates through beam path 2030, which can be compared to the path between paired reflectors 1712 and 1716 of FIG. 17, and impinges on reflector 2012 in the absence of the presence of scanning fiber 2020. For purposes of clarity, collimation optics, spectral filters, and the like are not illustrated. For comparison, the plan view illustrated in FIG. 20 is equivalent to the view in the longitudinal z-direction extending from piezoelectric actuator 212 down scanning fiber 220 in FIG. 17.

In the implementation illustrated in FIG. 20, the light from reflector 2010 propagates with a beam width W, which is matched to the diameter of scanning fiber 2020, which can be ~130 μm in some embodiments. At the centered or rest position, the fiber extends half way into the beam path such that approximately half of the light from reflector 2010 is reflected by reflector 2012. As the fiber begins to oscillate, for example, along the direction aligned with the beam width W, the detected signal will increase (movement to the left away from the beam path) or decrease (movement to the right into the beam path) as a result of the motion of the scanning fiber. In most fiber scanning patterns, the scanning fiber is positioned near the centered or rest position for a significant portion of the time during a scanning cycle. If the position of the scanning fiber was such that the scanning fiber was centered in the beam path (e.g., moved to the right by the scanning fiber radius), no light would be detected at the detector when the scanning fiber was in the centered or rest position and noise present in the system would impact the measurements of the scanning fiber position near the centered or rest position. By positioning the scanning fiber as illustrated in FIG. 20 with half of the emitted light detected when the scanning fiber is in the centered or rest position, signal-to-noise performance is improved significantly. One of ordinary skill in the art would recognize many variations, modifications, and alternatives.

Figure 21:
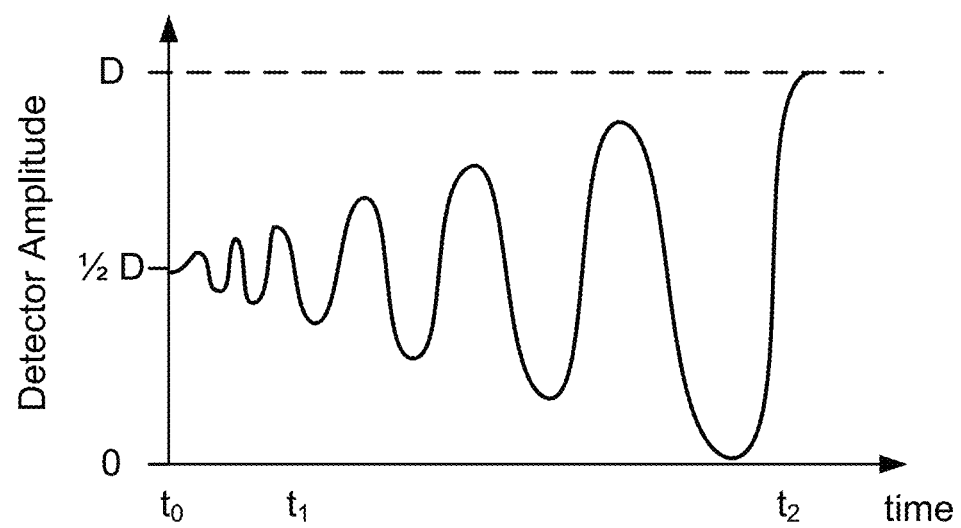
FIG. 21 is a simplified plot illustrating detector signal as a function of time according to an embodiment of the present invention.

FIG. 21 is a simplified plot illustrating a detector signal as a function of time according to an embodiment of the present invention. In this plot, the scanning fiber is positioned at the centered position at time t0. At the centered position, the detector signal is equal to half of the maximum amplitude since half of the emitted light is detected when the scanning fiber is in the centered or rest position as discussed in relation to FIG. 20 in which the scanning fiber is blocking half of the light propagating between paired reflectors. As the amplitude of oscillation begins to increase, for example at time $t_1$, the scanning fiber begins to move laterally into and out of the beam path (e.g., beam path 2030 in FIG. 20) and the amount of light detected at the detector begins to oscillate at levels below and below half of the maximum amplitude, respectively. As the amplitude of the oscillation reaches the maximum amplitude, for example, at time $t_2$, the scanning fiber moves laterally to an extent such that the scanning fiber is outside the beam path and the amount of light detected at the detector reaches a maximum equal to the maximum detected signal D. When the scanning fiber is positioned in the center of the beam path, since the beam width W and the scanning fiber diameter are equal, all of the emitted light is blocked and the detected signal decreases to zero.

Figure 22:
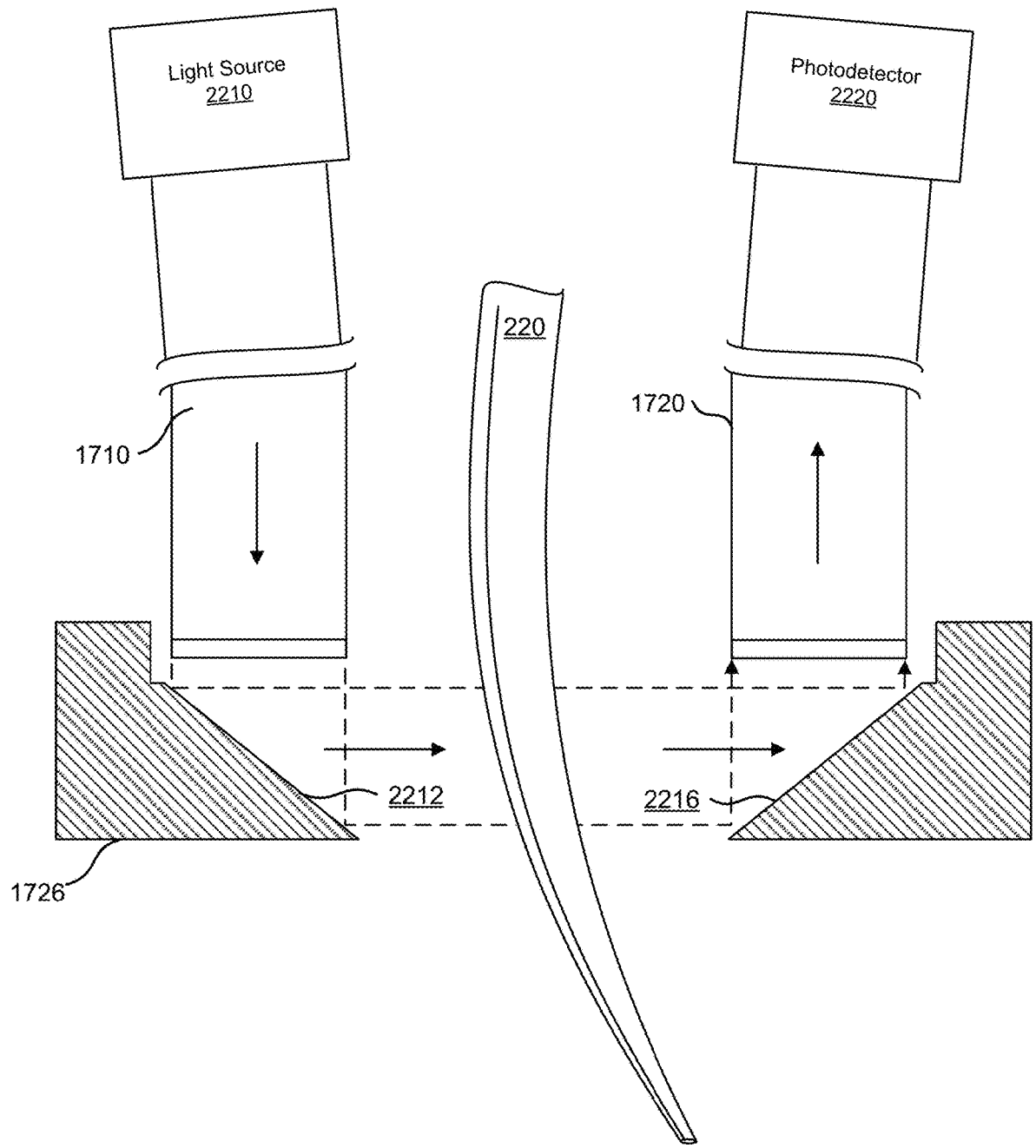
FIG. 22 is a simplified system diagram illustrating light propagation for the optical fiber pairs and the collar including reflectors of the fiber position detection system shown in FIG. 17.

FIG. 22 is a simplified system diagram illustrating light propagation for the optical fiber pairs and the substrate including reflectors of the fiber position detection system shown in FIG. 17. In FIG. 22, the system is illustrated with light generated by light source 2210 being conducted via optical source fiber 1710 towards substrate 1726. As described in more detail in reference to FIGS. 18A-18C, in the example illustrated in FIG. 22 substrate 1726 includes paired reflective surfaces 2212 and 2216, oriented to conduct light provided from optical source fiber 1710 to optical receiver fiber 1720. Optical receiver fiber 1720 conducts light thus received to photodetector 2220 as part of measurement of the motion of scanning fiber 220. Reflective surfaces 2212 and 2216 may be polished surfaces of substrate 1726 and/or reflective films or materials deposited onto facets of substrate 1726, for example, by low-pressure sputtering or other thin film deposition techniques. One of ordinary skill in the art would recognize many variations, modifications, and alternatives.

As shown in FIG. 22, depending on a scan pattern used, scanning fiber 220 moves in a direction including both in-plane and out-of-plane components relative to the light beam conducted between reflective surfaces 2212 and 2216, as described in more detail in reference to FIG. 20. When scanning fiber 220 moves toward the light beam it occludes the light beam to a greater extent, giving a negative first order derivative to the detected signal as a function of time, as described in more detail in reference to FIG. 21. When scanning fiber 220 moves away from the light beam, the reverse is true. As illustrated in FIG. 22, scanning fiber 220 is in motion at a position wherein at least a portion of the light beam is not occluded, such that light reaches optical receiver fiber 1720 and photodetector 2220.

Figure 23A:
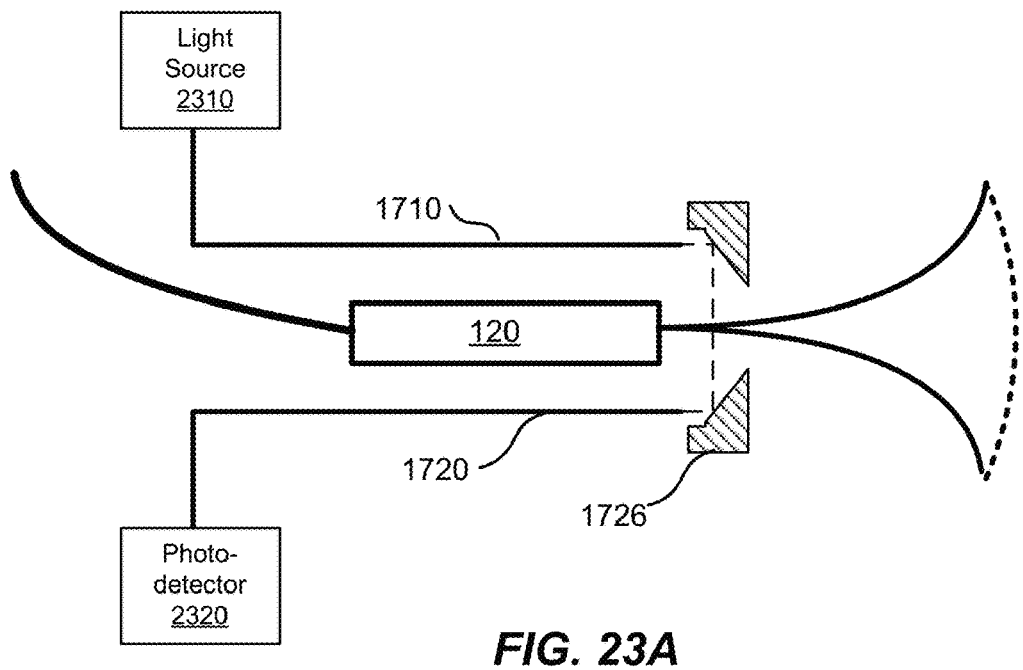
FIG. 23A is a simplified system diagram illustrating a light source and a photodetector of the fiber position detection system shown in FIG. 17.

FIG. 23A is a simplified system diagram illustrating a light source and a photodetector of the fiber position detection system shown in FIG. 17. In FIG. 23A, optical source fiber 1710 carries light emitted by light source 2310 toward substrate 1726, such that light is reflected off a reflector (e.g., reflector 1712 of FIG. 17) toward a paired reflector (e.g., reflector 1716 of FIG. 17) disposed at an opposing position across a central aperture of substrate 1726. Light thus conducted impinges on optical receiver fiber 1720, which conducts the light to photodetector 2320. In the example illustrated in FIG. 23A, light source 2310 and photodetector 2320 are separate from chassis 120 and substrate 1726, being in optical communication with each other through paired optical fibers conducting light to and from the appropriate paired reflectors. As described above, light source 2310 may be replaced with an OLED fabricated on the surface of the scanning fiber itself, such that each optical fiber may be in optical communication with a photodetector or the system may operate with two unpaired photodetectors. With respect to the location of light source 2310 and photodetector 2320, each may be isolated in separate portions of a larger augmented reality device with the light conducted therebetween by paired optical fibers. One of ordinary skill in the art would recognize many variations, modifications, and alternatives.

Figure 23B:
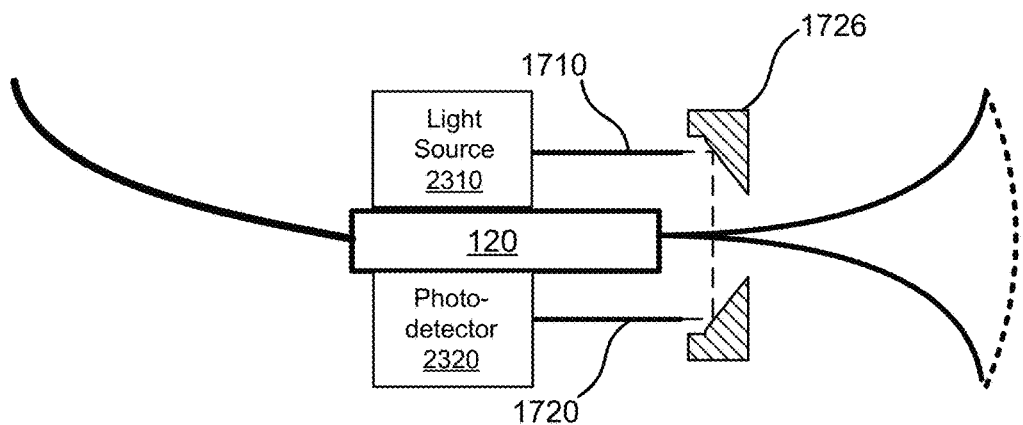
FIG. 23B is another simplified system diagram illustrating a light source and a photodetector of the fiber position detection system shown in FIG. 17.

FIG. 23B is another simplified system diagram illustrating a light source and a photodetector of the fiber position detection system shown in FIG. 17. In contrast to FIG. 23A, light source 2310 and photodetector 2320 may be mounted directly to chassis 120, or to some other structural component included in the fiber position detection system. One of ordinary skill in the art would recognize many variations, modifications, and alternatives.

Figure 23C:
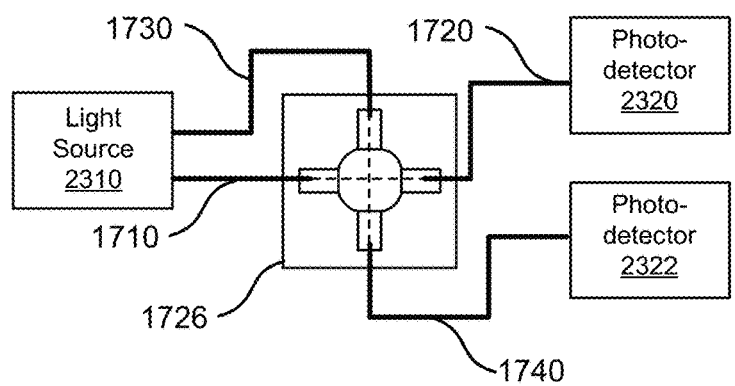
FIG. 23C is another simplified system diagram illustrating a light source and a photodetector of the fiber position detection system shown in FIG. 17.

FIG. 23C is another simplified system diagram illustrating a light source 2310 and photodetectors 2320 and 2322 of the fiber position detection system shown in FIG. 17. FIG. 23C shows a single light source 2310 providing light for optical source fibers 1710 and 1730 that then conduct light to two paired reflectors and thence to optical receiver fibers 1720 and 1740, respectively. In such an arrangement, a single light source 2310 may provide light for multiple photodetectors 2320 and 2322 and multiple optical source fibers may be avoided, for example by splicing a single optical source fiber or by disposing multiple optical waveguides in and/or on substrate 1726. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A projector including a cantilever position detection system, the projector comprising:
    a chassis;
    an actuator mounted to the chassis having an end;
    a cantilever light source having a longitudinal axis and an emission tip, wherein the cantilever light source is mechanically coupled to the actuator;
    a printed circuit board including an aperture and disposed in a position measurement region, wherein the cantilever light source extends through the aperture in the printed circuit board; and
    a plurality of optical source/photodetector pairs mounted on the printed circuit board and disposed in a lateral plane orthogonal to the longitudinal axis and oriented to define respective optical paths intersecting the cantilever light source between the end of the actuator and the emission tip of the cantilever light source.

2. The projector of claim 1 wherein the printed circuit board is disposed between the end of the actuator and the emission tip of the cantilever light source.

3. The projector of claim 1 wherein the lateral plane is disposed in the position measurement region.

4. The projector of claim 1 wherein the cantilever light source comprises a scanning light source.

5. The projector of claim 4 wherein the scanning light source comprises a scanning waveguide source.

6. The projector of claim 5 wherein the actuator comprises a piezoelectric actuator and the cantilever light source comprises a scanning fiber mechanically coupled to the piezoelectric actuator and defining a convex object surface.

7. The projector of claim 6 wherein a diameter of the scanning fiber is D and a beam width associated with each of the plurality of optical sources is 2D.

8. The projector of claim 5 wherein the scanning waveguide source comprises a microelectromechanical system (MEMS) element including a cantilevered waveguide.

9. The projector of claim 1 wherein the plurality of optical source/photodetector pairs comprise:
    a first light emitting diode and a first photodetector joined by a first optical path of the respective optical paths; and
    a second light emitting diode and a second photodetector joined by a second optical path of the respective optical paths;
    wherein the first optical path is orthogonal to the second optical path.

10. The projector of claim 9 wherein the first photodetector and the second photodetector comprise photodiodes.

11. The projector of claim 1 further comprising a printed circuit board cover joined to the printed circuit board, wherein the printed circuit board cover includes:
    a first channel disposed between a first optical source and a first detector joined by a first optical path of the respective optical paths; and
    a second channel disposed between a second optical source and a second detector joined by a second optical path of the respective optical paths.

12. The projector of claim 1 further comprising a plurality of electrical connectors disposed on the printed circuit board, wherein each of the plurality of optical source/photodetector pairs is in electrical communication with one of the plurality of electrical connectors.

13. The projector of claim 1 further comprising a spectral filter disposed between at least one of the optical source/photodetector pairs.

14. The projector of claim 1 further comprising an integrated lens assembly including a plurality of lenses, each of the plurality of lenses being optically coupled to one of the plurality of optical sources or plurality of photodetectors.

15. The projector of claim 1 wherein the cantilever light source is characterized by an intersection defined by at least a first surface of the cantilever light source at a first maximum deflection and a second surface of the cantilever light source at a second maximum deflection opposite the first maximum deflection, wherein the position measurement region is disposed proximal to the intersection.

16. The projector of claim 15 wherein a diameter of the cantilever light source is D, a beam width associated with each of the plurality of optical sources is 2D, and the position measurement region is disposed within 5D of the intersection.

17. The projector of claim 15 wherein the plurality of optical sources comprise semiconductor lasers.

18. The projector of claim 15 wherein the plurality of photodetectors comprise a photodiode.

19. The projector of claim 15 further comprising an optically opaque element positioned adjacent each photodetector of the plurality of photodetectors.

\* \* \* \* \*